(12) United States Patent
Jiang et al.

(10) Patent No.: US 9,096,700 B2
(45) Date of Patent: Aug. 4, 2015

(54) POLYMERIZATION PROCESS FOR PRODUCTION OF POLYMER

(71) Applicant: ExxonMobil Chemical Patents Inc., Baytown, TX (US)

(72) Inventors: Peijun Jiang, League City, TX (US); Keith E. Jolibois, Friendswood, TX (US); Ronald R. Thackston, Dickinson, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 16 days.

(21) Appl. No.: 14/090,425

(22) Filed: Nov. 26, 2013

(65) Prior Publication Data

US 2014/0163183 A1    Jun. 12, 2014

Related U.S. Application Data

(60) Provisional application No. 61/735,130, filed on Dec. 10, 2012.

(51) Int. Cl.
| | |
|---|---|
| *C08F 2/01* | (2006.01) |
| *C08F 4/643* | (2006.01) |
| *C08F 4/6592* | (2006.01) |
| *C08F 210/00* | (2006.01) |
| *C08F 210/02* | (2006.01) |
| *C08F 210/06* | (2006.01) |

(Continued)

(52) U.S. Cl.
CPC ............. *C08F 210/16* (2013.01); *C08F 2/01* (2013.01); *C08F 210/18* (2013.01); *C08F 4/65908* (2013.01)

(58) Field of Classification Search
CPC ........ C08F 2/01; C08F 2/001; C08F 4/65908; C08F 4/6592; C08F 4/65927; C08F 210/00; C08F 210/02; C08F 210/06; C08L 23/00; C08L 23/14

See application file for complete search history.

(56) References Cited

U.S. PATENT DOCUMENTS

| | | |
|---|---|---|
| 5,064,797 A | 11/1991 | Stricklen |
| 5,856,612 A | 1/1999 | Araki et al. |

(Continued)

FOREIGN PATENT DOCUMENTS

| | | |
|---|---|---|
| GB | 837055 | 6/1960 |
| GB | 860363 | 2/1961 |

(Continued)

OTHER PUBLICATIONS

Meimaroglou et al., "Prediction of Bivariate Molecular Property Distributions in Free-Radical Polymerization Systems Using Monte Carlo and Section Grid Methods", Chemical Product and Process Modeling, vol. 3, Issue 1, Article 44, 2008.

(Continued)

*Primary Examiner* — Caixia Lu
(74) *Attorney, Agent, or Firm* — Catherine L. Bell

(57) ABSTRACT

A process comprising contacting a catalyst system with one or more olefins in a bubble column reactor. Also, a polyolefin copolymer composition comprising ethylene, propylene and optionally a $C_4$ to $C_{20}$ alpha olefin; said composition having a bimodal distribution with respect to composition distribution, molecular weight distribution or a combination thereof; an Mw of 10,000 g/mol or more; and/or at least two melting peaks in a DSC heating cycle with a difference in melting temperatures of at least 5° C.

16 Claims, 2 Drawing Sheets

(51) Int. Cl.
   *C08F 210/16* (2006.01)
   *C08F 210/18* (2006.01)
   *C08F 4/659* (2006.01)

(56) References Cited

U.S. PATENT DOCUMENTS

| | | | |
|---|---|---|---|
| 6,908,972 | B2 | 6/2005 | Tsuie et al. |
| 2003/0105237 | A1 | 6/2003 | Winter et al. |
| 2004/0192861 | A1 | 9/2004 | Mutchler et al. |
| 2007/0185362 | A1 | 8/2007 | Lattner et al. |
| 2008/0249262 | A1 | 10/2008 | Chai |
| 2009/0018286 | A1 | 1/2009 | Hassan et al. |
| 2009/0209797 | A1* | 8/2009 | Moustafa et al. ............ 585/517 |
| 2009/0214405 | A1 | 8/2009 | Schneider et al. |
| 2010/0152390 | A1 | 6/2010 | De Gracia et al. |
| 2010/0279033 | A1 | 11/2010 | Becker et al. |
| 2010/0292421 | A1 | 11/2010 | Bando |
| 2011/0009580 | A1 | 1/2011 | Chai |
| 2012/0065346 | A1 | 3/2012 | Nozue et al. |
| 2013/0041119 | A1 | 2/2013 | Ochi et al. |
| 2013/0085244 | A1 | 4/2013 | Zhao et al. |
| 2013/0090433 | A1 | 4/2013 | Jiang et al. |
| 2013/0211009 | A1 | 8/2013 | Yang et al. |

FOREIGN PATENT DOCUMENTS

| | | |
|---|---|---|
| GB | 978101 | 12/1964 |
| GB | 2307191 | 5/1997 |
| JP | 2000143706 | 5/2000 |
| JP | 2011089019 | 6/2011 |
| JP | 2011137146 | 7/2011 |
| SU | 487497 | 10/1979 |
| WO | WO 99/35174 | 7/1999 |
| WO | 2009/060342 | 5/2009 |
| WO | 2009/060343 | 5/2009 |
| WO | 2009/121456 | 10/2009 |
| WO | WO 2012/005519 | 1/2012 |
| WO | WO 2012/133717 | 10/2012 |

OTHER PUBLICATIONS

Piel, "Polymerization of Ethene and Ethene-co-α-Olefm: Investigation of Short- and Long-Chain Branching and Structure-Property Relationship", Dissertation, Department of Chemistry, University of Hamburg, 2005.

Yang et al., "Alternative View of Long Chain Branch Formation by Metallocene Catalyst", Macromolecules, vol. 43, pp. 8836-8852, 2010.

Ha et al., *Modeling and Analysis of a Slurry Reactor System for Heterogeneous Olefin Polymerization: The effects of Hydrogen Concentration and Initial Catalyst Size*, Journal of Applied Polymer Science, vol. 79, 2001, pp. 2480-2493.

Reichert et al., *Reaction Engineeering Aspects of Ethylene Polymerization with Ziegler-Catalysts in Slurry Reactors*, Studies in Surface Science and Catalysis, vol. 25, 1986, pp. 369-386.

Ghasem et al., the effect of design parameters on industrial Unipol polyethylene fluidized bed polymerization process, Journal of Saudi Chemical Society, vol. 8(1), 2004, pp. 97-104 (Abstract).

* cited by examiner

POLYMERIZATION PROCESS FOR PRODUCTION OF POLYMER

CROSS-REFERENCE TO RELATED APPLICATIONS

This application claims the benefit of Provisional Application No. 61/735,130, filed Dec. 10, 2012 and EP 13159125.7 filed Mar. 14, 2013.

FIELD OF THE INVENTION

This invention relates to a method of making polymer blends.

BACKGROUND OF THE INVENTION

For many applications individual polymers do not possess a full range of performance characteristics required. Individual polyolefins having certain characteristics are often blended together in the hopes that the polymer blend will exhibit the best characteristics of its component polymers. Typically the result is a blend which displays an average of the individual properties of the individual resins. Physical blends also face problems of energy consumption, operational costs, and miscibility limitations. Unless the components are selected for their compatibility they can phase separate or smaller components can migrate to the surface. Reactor blends, also called intimate blends (a composition comprising two or more polymers made in the same reactor or in a series of reactors) are often used to address these issues along with the use of multiple catalyst systems. However, multiple catalyst systems that will operate under the same reactive environments to produce different polymers with desired properties remain problematic. Reactor polymer blends have also been produced in multiple stage process or multiple reactor systems; however, certain limits to the known methods of preparing reactor blends limit the suitability of this approach. Accordingly, there is continued interest in developing efficient and/or economical methods to produce desired reactor blends.

SUMMARY OF THE INVENTION

This invention relates to a process comprising contacting a catalyst system with one or more olefins in a bubble column reactor to form a polyolefin having a bimodal distribution with respect to composition distribution, molecular weight distribution or a combination thereof.

In an embodiment, this invention relates to a process comprising contacting a catalyst system with one or more olefins in a bubble column reactor to form a polyolefin having a bimodal distribution with respect to composition distribution, and molecular weight distribution.

In an embodiment, this invention also relates to a polyolefin copolymer composition comprising ethylene, propylene and optionally a $C_4$ to $C_{20}$ alpha olefin having: a bimodal distribution with respect to composition distribution, molecular weight distribution, or a combination thereof; an Mw of 10,000 g/mol or more; and at least two melting peaks in a DSC heating cycle with a difference in melting temperatures of at least 5° C. In an embodiment, the copolymer is obtained as a product stream from a bubble column reactor.

DETAILED DESCRIPTION

Figure 1:
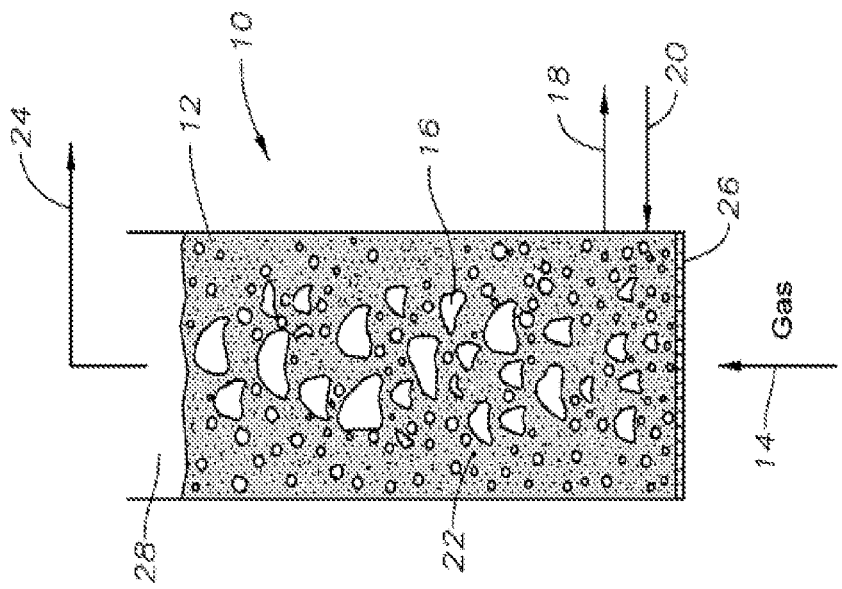
FIG. 1 shows an embodiment of a bubble column reactor according to the instant disclosure.

This invention relates in some embodiments to a polymerization process comprising a bubble column, which may be a solution bubble column or a slurry bubble column type of reactor. A bubble column reactor comprises a gas-bubble phase and a liquid solution phase. A slurry column type also has a solid phase where the liquid and solid are mixed in a slurry or suspension form. The individual gas bubbles in these types of reactors are embedded in the liquid solution or slurry phase and act as micro-reactors. Polymerization takes place in or at these bubbles in addition to the polymerization in the liquid or liquid slurry phase. Due to a difference in monomer concentration between the gas bubbles and liquid phases, the polymers produced in the bubble phase and liquid phase typically have different composition and molecular weight. The overall product from the reactor may have bimodal distributions in molecular weight distribution (MWD) as well as composition distribution (CD), and the like. Extensive exchanges between the bubbles and liquid phases also take place in this type of reactor due to bubble break-up and/or coalescence. Polymers with a blocky structure or branched cross products are also possible in some embodiments.

In an embodiment, this invention relates to a process comprising contacting a catalyst system with one or more olefins in a bubble column reactor at bimodal polymerization conditions to form a polyolefin having a bimodal distribution with respect to composition distribution and/or molecular weight distribution or a combination thereof. In an embodiment, the polyolefin has an Mw of 10,000 g/mol or more. In an embodiment, the polyolefin comprises at least two melting peaks in a DSC heating cycle with a difference in melting temperatures of at least 5° C. In an embodiment, the one or more olefins comprise ethylene, propylene, $C_4$ to $C_{20}$ alpha olefin, or a combination thereof. By bimodal polymerization conditions is meant polymerization condition, such as, but not limited to, pressure, bubble quantity, bubble size, concentrations of monomer, co-monomer, catalyst, activator, scavenger, temperature, etc., that contribute to the bimodal/multi-modal polymer properties described herein. Molecular weight distribution is defined to be Mw/Mn. Composition distribution is determined using a Temperature Rising Elution Fractionation chromatogram curve generated as described below.

In an embodiment, the catalyst system comprises a metallocene catalyst. In an embodiment, the catalyst system comprises a homogenous catalyst and the bubble column reactor comprises a polymer solution reactor. In an embodiment, the catalyst system comprises a supported catalyst and the bubble column reactor comprises a polymer slurry reactor. In an embodiment, the process comprises sparging a gaseous olefin feedstream into the bubble column reactor.

In an embodiment, the process comprises introducing first and second olefin feedstreams into the bubble column reactor, wherein the first olefin feedstream is liquid and the second olefin feedstream is gaseous. In an embodiment, the first olefin feedstream comprises propylene and the second olefin feedstream comprises ethylene. In an embodiment, the second olefin feedstream further comprises propylene. In an embodiment, the second olefin feedstream further comprises a gaseous diluent, hydrogen, or a combination thereof.

In an embodiment, the process further comprises recycling overhead vapor from the bubble column reactor to the second olefin feedstream. In an embodiment, the process further comprises recovering a polyolefin product stream from the bulk liquid phase, recovering polyolefin from the polyolefin product stream to form a polyolefin-lean stream, and recycling at least a portion of the polyolefin-lean stream to the bubble column reactor. In an embodiment, the process further comprises maintaining a heterogeneous regime (churn-turbulent regime) in the bubble column. In an embodiment, the process further comprises supplying a liquid diluent to a bulk phase in the bubble column reactor.

In an embodiment, a polyolefin copolymer composition comprises ethylene, propylene and optionally a $C_4$ to $C_{20}$ alpha olefin; a bimodal distribution with respect to composition distribution, and/or molecular weight distribution or a combination thereof; an Mw of 10,000 g/mol or more; and at least two melting peaks in a DSC heating cycle with a difference in melting temperatures of at least 5° C. In an embodiment, the difference in melting temperatures is at least 10° C., or at least 15° C., or at least 20° C., or at least 30° C.

In an embodiment, the copolymer is obtained as a product stream from a bubble column reactor. In an embodiment, the copolymer is obtained as the product of the bubble column reactor process according to any one of the process embodiments described herein.

In an embodiment, a process comprises providing a bulk liquid phase comprising a first olefin and a polymerization catalyst system in a bubble column reactor system; directing a gaseous stream comprising a second olefin at least partially through the bulk liquid phase at a gas velocity sufficient to produce a stream of bubbles thereby contacting the first olefin and the second olefin with the catalyst system at a temperature and a pressure sufficient to produce a product polyolefin having a multi-modal molecular weight distribution. In an embodiment, the first olefin and the second olefin are different, and wherein the gaseous stream comprises the first olefin and the second olefin. In an embodiment, the first olefin is identical to the second olefin. In an embodiment, the bulk liquid phase comprises a diluent which is a liquid at the temperature and pressure of the bubble column reactor system. In an embodiment, the gaseous stream comprises a gaseous diluent, hydrogen, or a combination thereof. In an embodiment, at least a portion of olefin in a headspace of the bubble column reactor system is recycled back into the bubble column reactor system as the gaseous stream. In an embodiment, at least a portion of material in a headspace of the bubble column is removed from the reactor system, followed by condensing at least a portion of the removed headspace material to produce a liquid recycle stream, and recycling at least a portion of the liquid recycle stream back into the bubble column reactor system, which may include recycle to the bulk liquid phase. In an embodiment, at least a portion of the bulk liquid phase is removed, followed by removing at least a portion of the product polyolefin therefrom to produce a bulk liquid phase recycle stream, and recycling at least a portion of the bulk liquid phase recycle stream back into the bubble column reactor system. In an embodiment, the gas velocity is sufficient to produce a turbulent flow regime in the bubble column reactor system. In an embodiment, the first olefin comprises a $C_4$ to $C_{20}$ alpha olefin. In an embodiment, the second olefin comprises ethylene, propylene, or a combination thereof. In an embodiment, the pressure and temperature are selected such that the bulk liquid phase is a solution. In an embodiment, the pressure and temperature are selected such that the bulk liquid phase is a slurry. In an embodiment, the polymerization catalyst system comprises a supported olefin polymerization catalyst, a supported activator, or a combination thereof. In an embodiment, the polymerization catalyst system comprises a homogeneous olefin polymerization catalyst.

In an embodiment, the product polyolefin has a bi-modal composition distribution as reflected by the presence of multiple peaks in a DSC heating cycle. In an embodiment, the product polyolefin has a first melting temperature which is at least 30° C. higher than a second melting temperature as determined using DSC according to the procedure described in the Experimental section, or an equivalent thereof, as readily understood by one having ordinary skill in the art. In an embodiment, the product polyolefin has a multi-modal compositional distribution with respect to the incorporation of the second olefin, the molecular weight distribution, the percent crystallinity in the polymer species present, or a combination thereof. In an embodiment, the gaseous stream has an average residence time from about 0.1 minutes to about 30 minutes. In an embodiment, the polymerization catalyst system comprises a plurality of catalysts, activators, or a combination thereof. In an embodiment, the bubble column reactor system comprises a plurality of bubble columns arranged in serial communication, parallel communication, or a combination thereof.

DEFINITIONS

For purposes herein, the new numbering scheme for the Periodic Table Groups is used as in Chem. Eng. News, 1985, 63, 27. Therefore, a "Group 4 metal" is an element from Group 4 of the Periodic Table.

The term "substituted" means that a hydrogen group has been replaced with a hydrocarbyl group, a heteroatom, or a heteroatom containing group. For example, methyl cyclopentadiene (Cp) is a Cp group substituted with a methyl group and ethyl alcohol is an ethyl group substituted with an —OH group.

The terms "hydrocarbyl radical," "hydrocarbyl," and "hydrocarbyl group" are used interchangeably throughout this document. Likewise, the terms "functional group," "group," and "substituent" are also used interchangeably in this document. For purposes of this disclosure, "hydrocarbyl radical" is defined to be $C_1$ to $C_{20}$ radicals, that may be linear, branched, or cyclic (aromatic or non-aromatic), and may include substituted hydrocarbyl radicals as defined herein. In an embodiment, a functional group may comprise a hydrocarbyl radical, a substituted hydrocarbyl radical, or a combination thereof.

Substituted hydrocarbyl radicals are radicals in which at least one hydrogen atom has been substituted with a heteroatom or heteroatom containing group, or with atoms from Groups 13, 14, 15, 16, and 17 of the Periodic Table of Elements, or a combination thereof, or with at least one functional group, such as halogen (Cl, Br, I, F), $NR*_2$, $OR*$, $SeR*$, $TeR*$, $PR*_2$, $AsR*_2$, $SbR*_2$, $SR*$, $BR*_2$, $SiR*_3$, $GeR*_3$, $SnR*_3$, $PbR*_3$, and the like or where at least one heteroatom has been inserted within the hydrocarbyl radical, such as halogen (Cl, Br, I, F), O, S, Se, Te, $NR*$, $PR*$, $AsR*$, $SbR*$, $BR*$, $SiR*_2$, $GeR*_2$, $SnR*_2$, $PbR*_2$, and the like, where R* is, independently, hydrogen or a hydrocarbyl radical, or any combination thereof.

In an embodiment, the hydrocarbyl radical is independently selected from methyl, ethyl, ethenyl, and isomers of propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, triacontyl, propenyl, butenyl, pentenyl, hexenyl, heptenyl, octenyl, nonenyl, decenyl, undecenyl, dodecenyl, tridecenyl, tetradecenyl, pentadecenyl, hexadecenyl, heptadecenyl, octadecenyl, nonadecenyl, eicosenyl, heneicosenyl, docosenyl, tricosenyl, tetracosenyl, pentacosenyl, hexacosenyl, heptacosenyl, octacosenyl, nonacosenyl, triacontenyl, propynyl, butynyl, pentynyl, hexynyl, heptynyl, octynyl, nonynyl, decynyl, undecynyl, dodecynyl, tridecynyl, tetradecynyl, pentadecynyl, hexadecynyl, heptadecynyl, octadecynyl, nonadecynyl, eicosynyl, heneicosynyl, docosynyl, tricosynyl, tetracosynyl, pentacosynyl, hexacosynyl, heptacosynyl, octacosynyl, nonacosynyl, and triacontynyl. Also included are isomers of saturated, partially unsaturated, and aromatic cyclic structures wherein the radical may additionally be subjected to the types of substitutions described above. Examples include phenyl, methylphenyl, benzyl, methylbenzyl, naphthyl, cyclohexyl, cyclohexenyl, methylcyclohexyl, and the like. For this disclosure, when a radical is listed, it indicates that radical type and all other radicals formed when that radical type is subjected to the substitutions defined above. Alkyl, alkenyl, and alkynyl radicals listed include all isomers including, where appropriate, cyclic isomers, for example, butyl includes n-butyl, 2-methylpropyl, 1-methylpropyl, tert-butyl, and cyclobutyl (and analogous substituted cyclopropyls); pentyl includes n-pentyl, cyclopentyl, 1-methylbutyl, 2-methylbutyl, 3-methylbutyl, 1-ethylpropyl, and neopentyl (analogous substituted cyclobutyls and cyclopropyls); and butenyl includes E and Z forms of 1-butenyl, 2-butenyl, 3-butenyl, 1-methyl-1-propenyl, 1-methyl-2-propenyl, 2-methyl-1-propenyl, and 2-methyl-2-propenyl (cyclobutenyls and cyclopropenyls). Cyclic compounds having substitutions include all isomer forms, for example, methylphenyl would include ortho-methylphenyl, meta-methylphenyl, and para-methylphenyl; dimethylphenyl would include 2,3-dimethylphenyl, 2,4-dimethylphenyl, 2,5-dimethylphenyl, 2,6-diphenylmethyl, 3,4-dimethylphenyl, and 3,5-dimethylphenyl.

In the structures depicted throughout this specification and the claims, a solid line indicates a bond, an arrow indicates that the bond may be dative, and each dashed line represents a bond having varying degrees of covalency and a varying degree of coordination.

For purposes herein, a supported catalyst and/or activator refers to a catalyst compound, an activator, or a combination thereof located on, in or in communication with a support wherein the activator, the catalyst compound, or a combination thereof are deposited on, vaporized with, bonded to, incorporated within, adsorbed or absorbed in, adsorbed or absorbed on, the support.

For purposes herein an "olefin," alternatively referred to as "alkene," is a linear, branched, or cyclic compound comprising carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer.

For purposes herein, a polymer or polymeric chain comprises a concatenation of carbon atoms bonded to each other in a linear or a branched chain, which is referred to herein as the backbone of the polymer (e.g., polyethylene). The polymeric chain may further comprise various pendent groups attached to the polymer backbone which were present on the monomers from which the polymer was produced. These pendent groups are not to be confused with branching of the polymer backbone, the difference between pendent side chains and both short and long chain branching being readily understood by one of skill in the art.

For purposes herein the term "polymer" and "polyolefin" are used interchangeable to refer to molecule having two or more of the same or different "mer" units. A "homopolymer" is a polymer having mer units that are the same. A "copolymer" is a polymer having two or more mer units that are different from each other. A "terpolymer" is a polymer having three mer units that are different from each other. "Different" in reference to mer units indicates that the mer units differ from each other by at least one atom or are different isomerically. Accordingly, the definition of copolymer, as used herein, includes terpolymers and the like. An oligomer is typically a polymer having a low molecular weight, such as an Mn of less than 25,000 g/mol, or in an embodiment, less than 2,500 g/mol, or a low number of mer units, such as 75 mer units or less. An "ethylene polymer" or "ethylene copolymer" is a polymer or copolymer comprising at least 50 mole % ethylene derived units, a "propylene polymer" or "propylene copolymer" is a polymer or copolymer comprising at least 50 mol % propylene derived units, and so on.

For the purposes of this disclosure, the term "α-olefin," or alpha olefin includes $C_2$— to $C_{22}$ olefins. Non-limiting examples of α-olefins include ethylene, propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 1-heneicosene, 1-docosene, 1-tricosene, 1-tetracosene, 1-pentacosene, 1-hexacosene, 1-heptacosene, 1-octacosene, 1-nonacosene, 1-triacontene, 4-methyl-1-pentene, 3-methyl-1-pentene, 5-methyl-1-nonene, 3,5,5-trimethyl-1-hexene, vinylcyclohexane, and vinylnorbornane. Non-limiting examples of cyclic olefins and diolefins include cyclopropene, cyclobutene, cyclopentene, cyclohexene, cycloheptene, cyclooctene, cyclononene, cyclodecene, norbornene, 4-methylnorbornene, 2-methylcyclopentene, 4-methylcyclopentene, vinylcyclohexane, norbornadiene, dicyclopentadiene, 5-ethylidene-2-norbornene, vinylcyclohexene, 5-vinyl-2-norbornene, 1,3-divinylcyclopentane, 1,2-divinylcyclohexane, 1,3-divinylcyclohexane, 1,4-divinylcyclohexane, 1,5-divinylcyclooctane, 1-allyl-4-vinylcyclohexane, 1,4-diallylcyclohexane, 1-allyl-5-vinylcyclooctane, and 1,5-diallylcyclooctane.

The terms "catalyst," "catalyst compound," and "transition metal compound" are defined to mean a compound capable of initiating polymerization catalysis under the appropriate conditions. In the description herein, the catalyst may be described as a catalyst precursor, a pre-catalyst compound, or a transition metal compound, and these terms are used interchangeably. A catalyst compound may be used by itself to initiate catalysis or may be used in combination with an activator to initiate catalysis. When the catalyst compound is combined with an activator to initiate catalysis, the catalyst compound is often referred to as a pre-catalyst or catalyst precursor. A "catalyst system" is combination of at least one catalyst compound, at least one activator, an optional co-activator, and an optional support material, where the system can polymerize monomers to polymer. For the purposes of this invention and the claims thereto, when catalyst systems are described as comprising neutral stable forms of the components, it is well understood by one of ordinary skill in the art that the ionic form of the component is the form that reacts with the monomers to produce polymers.

An "anionic ligand" is a negatively charged ligand which donates one or more pairs of electrons to a metal ion. A "neutral donor ligand" is a neutrally charged ligand which donates one or more pairs of electrons to a metal ion.

A scavenger is a compound that is typically added to facilitate oligomerization or polymerization by scavenging impurities. Some scavengers may also act as activators and may be referred to as co-activators. A co-activator, that is not a scavenger, may also be used in conjunction with an activator in order to form an active catalyst. In an embodiment, a co-activator can be pre-mixed with the catalyst compound to form an alkylated catalyst compound.

An ethylene polymer is a polymer having at least 50 mol % of ethylene, a propylene polymer is a polymer having at least 50 mol % of propylene, and so on. As used herein, Mn is number average molecular weight, Mw is weight average molecular weight, Mz is z average molecular weight, wt % is weight percent, and mol % is mole percent. Molecular weight distribution (MWD) is defined to be Mw divided by Mn. Unless otherwise noted, all molecular weight units, e.g., Mw, Mn, Mz, are g/mol.

The following abbreviations may be used through this specification: Me is methyl, Ph is phenyl, Et is ethyl, Pr is propyl, iPr is isopropyl, n-Pr is normal propyl, Bu is butyl, iso-butyl is isobutyl, sec-butyl refers to secondary butyl, tert-butyl, refers to tertiary butyl, n-butyl is normal butyl, pMe is para-methyl, Bz is benzyl, THF is tetrahydrofuran, Mes is mesityl, also known as 1,3,5-trimethylbenzene, Tol is toluene, TMS is trimethylsilyl, TIBAL is triisobutylaluminum, TNOAL is triisobutyl n-octylaluminum, MAO is methylalumoxane, and MOMO is methoxymethoxy (also referred to as methoxymethyl ether).

For purposes herein, RT is room temperature, which is defined as 25° C. unless otherwise specified. All percentages are weight percent (wt %) unless otherwise specified.

As used herein, the terms "product polyolefin" and "reactor blend" are used interchangeably to refer to a mixture of polymers produced in one or more polymerization zones in the same polymerization process/system without the need for post polymerization blending. However, this is not intended to limit the product polyolefin according to the instant disclosure since the resultant product polyolefin may undergo post polymerization blending, for example, to incorporate additional polymeric species, modifiers, additives, and/or the like. Each polymer component in the mixture possesses a unique molecular structure such as percent comonomer content, molecular weight distribution, amount of crystallinity, and/or molecular architectures such as branched block copolymer products.

A polymerization zone is defined as an area where olefins are contacted with polymerization catalysts systems under conditions sufficient to produce a polyolefin. For purposes herein, multiple reactors may be dimensioned and arranged in series configurations, parallel configuration, or a combination thereof wherein each reactor is considered as a separate polymerization zone. For a multi-stage polymerization in both a batch reactor and a continuous reactor, each polymerization stage is considered as a separate polymerization zone. For a bubble column type of reactor, the bubble region and liquid region are considered as a separate polymerization zone.

As used herein, a solution refers to a clear single phase liquid in contrast to a slurry, which refers to a turbid multiple phase combination of a solid and a liquid. A solution polymerization refers to conditions wherein the product polymer and the olefins, are present as a solution, or are present below a cloud point such that a clear solution is present. A slurry polymerization refers to a condition wherein the polymer starts to solidify and is phase separated from a liquid medium. The cloud point of a polymer solution is the temperature (at a given pressure) or the pressure (at a given temperature) at which dissolved polymers are no longer completely soluble, phase-separated as a second phase, giving the polymer solution a cloudy appearance. The cloud point is the pressure below which, at a given temperature, the polymerization system becomes turbid as described in J. Vladimir Oliveira, C. Dariva, and J. C. Pinto, Ind. Eng, Chem. Res. 39, 2000, 4627. For purposes of this invention and the claims thereto, the cloud point is measured by shining a helium laser through the selected polymerization system in a cloud point cell onto a photocell and recording the pressure at the onset of rapid increase in light scattering for a given temperature. Cloud point pressure is the point at which at a given temperature, the polymerization system becomes turbid. Cloud point temperature is the point at which at a given pressure, the polymerization system becomes turbid.

For a liquid mixture comprising two or more components, the bubble point is defined as the pressure at a constant temperature or the temperature at a constant pressure where a first bubble of vapor is formed. Likewise, dew point of a solution is the set of conditions (either a temperature at constant pressure or a pressure at constant temperature) at which the first drops of a vapor mixture begin to condense. The mixture is in the liquid phase when the pressure is higher than the bubble point pressure. The boiling point of a pure substance or element is the temperature at which the vapor pressure of a liquid equals the surrounding environmental pressure.

As used herein the term "branched block copolymer" is defined as the cross product obtained when a first polymer chain (also referred as macromonomer) with reactive polymerizable chain ends is incorporated into a second polymer chain during the polymerization of the latter to form a structure comprising a backbone defined by one of the polymer chains with branches of the other polymer chains extending from the backbone. Backbone and branches possess different and unique molecular structures, such as chemical composition and/or crystallinity. For example, a polypropylene homopolymer with vinyl chain ends can be incorporated into a propylene copolymer chain to form a branched cross-product with a propylene copolymer backbone and polypropylene side branches. Since the molecular structure/composition in the backbone and branches are different, the branched block composition has characteristics from both the backbone and the branches. The branched block products are also referred to as branched cross products.

In an embodiment, a process comprises providing a bulk liquid phase comprising a first olefin and a polymerization catalyst system in a bubble column reactor system; directing a gaseous stream comprising a second olefin at least partially through the bulk liquid phase at a gas velocity sufficient to produce a stream of bubbles thereby contacting the first olefin and the second olefin with the catalyst system at a temperature and a pressure sufficient to produce a product polyolefin having a multi-modal molecular weight distribution.

For purposes herein, a bubble column reactor system refers to a cylindrical vessel with a gas distributor at the bottom. The gas is introduced into the column through the distributor, and dispersed in a liquid in forms of bubbles. The liquid either stays in the column in a batch mode of operation, or is continuously fed into and discharged from the column in a continuous process through associated piping, valves, heat exchangers, and the like. A bubble column reactor system may also be referred to as a slurry column, wherein solid particles are suspended in the bulk liquid phase to form a liquid-solid suspension (or liquid-solid slurry). The difference between a bubble column and a slurry column lie in that slurry column has a liquid-solid phase instead of a liquid phase as the bulk liquid phase of the bubble column. Both bubble column and slurry column have similar characteristics and share the same type of designs and operations. Bubble column reactors have been built in numerous forms of construction. The mixing is done by the gas sparging and it requires less energy than mechanical stirring. The liquid can be in parallel flow or counter-current flow. The features and characteristics of bubble column type of reactors are well documented in the literature (e.g., Bubble Column Reactions, by Wolf-Dieter Deckwer, published by John Wiley & Sons in December 1991) which is incorporated by reference herein in its entirety.

For purposes herein, a bubble column reactor or a bubble column reactor system comprises a gas-bubble phase and a bulk liquid solution phase. A bubble column may be utilized as a homogeneous column or a heterogeneous column. A slurry column type of reactor comprises a gas bubble phase, and a bulk liquid phase which is a slurry including a solid phase. The liquid and solid are mixed together and are present in a slurry (or suspension) form. For purposes herein, a bubble column refers to either a homogeneous (i.e., a solution or liquid) column, or a heterogeneous (i.e., a slurry) column. Accordingly, for simplicity, unless otherwise specified, the terms bubble column, bubble column reactor, bubble column reactor system, liquid bubble column, solution bubble column, slurry column, slurry column reactor, and slurry column reactor system are used interchangeably.

Referring to FIG. 1 of the drawings, reference numeral 10 generally indicates a bubble column reactor in accordance with an embodiment of the instant disclosure for polymerizing an olefin. The reactor 10 includes a bulk liquid phase 12, which may include one or more polymerization catalysts, optionally a solvent, and/or one or more polymerization reagents including chain termination reagents, scavengers, cocatalysts, and/or the like. A vaporized or gaseous olefin feedstream 14 enters a bottom of reactor 10 through one or more spargers 26 such that the vaporized or gaseous olefin feedstream 14 enters the bottom of the bubbling column of bulk liquid phase 12 as a plurality of bubbles wherein the olefins are contacted with the catalyst under polymerization conditions.

A gaseous overhead 28 leaves from a top of reactor 10 through one or more gaseous recycle or vent lines 24, which may be arranged to recycle at least a portion of the vaporized overhead back into the gaseous feed 14.

Figure 2:
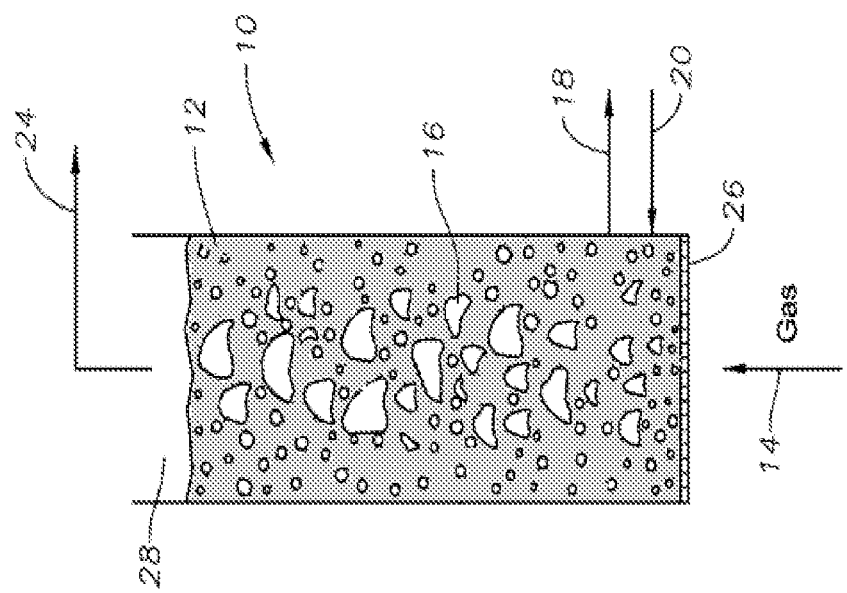
FIG. 2 shows an embodiment of a slurry bubble column reactor according to the instant disclosure.

In an embodiment, an olefin is fed as gaseous feed 14 which forms bubbles 16 wherein the gaseous feed 14 contacts the bulk liquid phase 12 in the presence of a catalyst, to produce polyolefins according to the instant disclosure, which may be subsequently removed from the reactor by one or more product removal lines 18. The bulk liquid phase 12 may be refreshed, additional catalyst, solvent, and/or reagents added, and/or one or more of the various streams recycled back to the reactor by one or more recycle lines 20. As shown in FIG. 2, the bulk liquid phase 12 of the bubbling column reactor 10 may comprise an admixture of products and a solvent which may include a slurried catalyst system 22, with fast rising bubbles 16 of vaporized olefin feed 14 passing upwardly through the bubbling column 10 of bulk liquid phase 12. The fast rising gas bubbles 16 may be introduced into reactor 10 to create vigorous mixing inside the bulk liquid phase 12, turning the bulk liquid phase 12 into a bubbling column. This is important and advantageous, as it may allow the reactor 10 to operate without a stirrer or agitator, which, if present, may be susceptible to fouling. Unreacted gaseous olefin stream 24 may be recycled back to the reactor 10 together with fresh olefin feed 14, and/or hydrogen or other polymerization reagents, and/or the like.

Superficial gas velocity is defined as the gas throughputs per unit cross-sectional area of the bubble column. Gas holdup is defined as the volume fraction of gas phase occupied by the gas bubbles. Likewise the liquid and solid phase holdup is defined as the volume fraction of liquid and solid phases, respectively. Superficial liquid velocity is defined as the liquid throughputs per unit cross-sectional area of the bubble column.

The fluid dynamic characterization of bubble column reactors has a significant effect on the operation and performance of bubble column reactor systems. Operation of bubble column reactors is typically classified into three flow regimes according to its flow characteristics. These three regimes are the homogeneous (also referred to as a bubbly flow or dispersed) regime; the heterogeneous (also referred to as a churn-turbulent) regime and slug flow regime. The flow regimes in bubble columns are classified and maintained according to the superficial gas velocity employed in the column. The bubble flow regime, also called the homogeneous flow regime is obtained at low superficial gas velocities. This flow regime is characterized by bubbles of relatively uniform small sizes and low rising velocities, and is considered for purposes herein to represent non-turbulent flow. A uniform bubble distribution and relatively gentle mixing is observed over the entire cross-sectional area of the column. There is practically no bubble coalescence or break-up, thus bubble size in this regime is almost completely dictated by the sparger design and the physical properties of the liquid or liquid-solid. The gas holdup in the bubbly flow regime increases almost linearly with increasing superficial gas velocity. Mass transfer between the bubbles and liquid medium occurs at the interfaces mainly through diffusion.

A churn-turbulent regime, also called the heterogeneous regime, refers to conditions involving turbulent flow maintained at higher superficial gas velocities. This regime is characterized by the disturbed form of the homogeneous gas-liquid system due to enhanced turbulent motion of gas bubbles and liquid recirculation in the reactor. As a result of unsteady flow pattern and high gas throughputs large bubbles with short residence times are formed by bubble coalescence. This flow regime is thus sometimes referred to as coalesced bubble flow regime, indicating the much different sizes of the bubbles and frequent bubble break-up and coalescence. Bubble coalescence and break-up result in a wide bubble size distribution characteristic of a churn-turbulent regime. The average bubble size is governed by coalescence and break-up which is controlled by the energy dissipation rate in the bulk. Vigorous mixing or mass exchange between bubble phase and liquid phase takes place in this regime. Churn-turbulent flow is frequently observed in industrial-size, large diameter columns.

A slug flow regime has been only observed in small diameter columns at high gas flow rates. This regime takes its name from the formation of bubble slugs when larger bubbles are stabilized by the column wall.

In an embodiment, each individual bubble in the process disclosed herein is considered to form an individual reactor embedded in the liquid solution or slurry phase, each acting as a micro-reactor. Polymerization is thought to take place inside the bubbles in addition to the polymerization in the bulk liquid phase in a bubble column reactor or in the liquid-solid slurry phase in a slurry column. Due to the difference in monomer concentration between the gas bubbles and liquid phases, the polymer produced in the bubble phase and liquid phase has been discovered to have different composition and molecular weight distributions. The overall product from the bubble column reactor system disclosed herein is a polymer product having a multi-modal, or a bimodal distribution in molecular weight distribution (MWD), composition distribution (CD), crystallinity, and/or a combination thereof. Extensive exchange between the bubbles and liquid phases is thought to take place in this type of reactor due to bubble break-up and coalescence. In an embodiment, polymers with a blocky structure or branched cross products can also be produced. The reactor blends are derived from the components produced from the bubble phase and the bulk liquid (or slurry) phase.

In an embodiment, hydrodynamic characteristics of a bubble column reactor or a slurry column reactor are achieved by means of upward flowing gas in and through the bulk liquid phase present in the column. In an embodiment, the gas phase is introduced into the reactor through an arrangement of feed nozzles. The feed nozzle arrangement is known by various names in the art such as distributor, sparger, gas distributor plate, gas distributing grid, perforated plate, gas dispersion grid, or the like. A feed nozzle at the bottom section of the reactor is used to distribute the gas across the reactor cross-section and to prevent the reactor content from entering the gas supply plenum. In an embodiment, the feed nozzle parameters may be dimensioned, arranged, and altered to produce particular bubble characteristics which in turn affect gas holdup and thus many other parameters characterizing bubble column reactors.

In an embodiment, the feed nozzle may include a downward pointing nozzle, which prevents clogging of the sparger with polymer if the gas flow is stopped and which are generally considered to be more effective for dispersing a catalyst. In addition, downward gas ejection has been discovered to produce improved bubble formation for purposes herein relative to upward injection nozzles. In an embodiment, the feed nozzles are dimensioned and arranged to produce a uniform distribution of gas feed across the reactor cross section, which is thought to be useful to achieve mixing between the rising gas bubbles and the bulk liquid medium.

In an embodiment, non-uniform gas distribution may be used to alter the liquid flow pattern inside the column. In an embodiment, a gas distributor may comprise orifices or porous metal spargers. In an embodiment, orifices of the gas distributor may be arranged and dimensioned to produce non-uniform gas distribution, as well as be placed facing upwards, downwards or both.

The process disclosed herein can be used to produce polymer blends with a wide variety of compositions. In an embodiment, a blend component is primarily produced in the liquid phase in a bubble column or in the liquid-solid suspension phase in a slurry column type of reactors through the contact of catalyst and monomers in a liquid region of the bubble column reactor, and another component is primarily produced in a bubble region of the bubble column reactor. In an embodiment, polymer produced in the bubble region is mixed with polymer produced in the liquid region through bubble breakup and coalescence as well as bulk liquid recirculation. In an embodiment, an intimate polymer blend is formed due to the intensive mixing of the disparate polymeric species produced in the reactor. In an embodiment, the compositions of the polymer components can be adjusted through the monomer concentration in each region of the reactor, which may be controlled through a variety of means disclosed herein.

In an embodiment, the solvents or diluents utilized in the process are selected such that the thermodynamic properties of the solvents and monomers are different. In an embodiment, the selection is directed to the concentration of a monomer with lower boiling point being higher in the bubble region than in the liquid or slurry region. In an embodiment, the selection may be relative to the content of lower boiling point monomer in the polymers produced in the bubble region being higher than that in the polymer produced in the liquid or slurry region. In an embodiment, the ratio of the two or more components depends on the gas holdup in a reactor, which is also effected by the selection of the solvents.

In an embodiment, the composition distributions in each region may be controlled by selection of the temperature and/or pressure as well as the composition of the particular gaseous feed, bulk liquid medium, or both. In an embodiment, the gaseous stream directed into the bulk liquid phase may comprise an inert gas or diluent, such as nitrogen, to control the flow regime and change the chemical composition in the gas bubbles. In an embodiment, the gaseous stream may include reactive substances, such as hydrogen, to further control the properties of the polymers produced therein. In an embodiment, additional inert gas may be provided to increase the overall gas flow rate and superficial gas velocity.

In an embodiment, the instant polymerization process is operated in the churn-turbulent regime. In an embodiment, the inert gas can be mixed with other materials such as monomers and introduced into the reactor as a mixture or fed into the reactor as a separated stream.

In an embodiment, the gas velocity is sufficient to produce a turbulent flow of gas bubbles through the bubble column reactor system. In an embodiment, the superficial gas velocity is greater than 0.05 m/second, or from 0.05 m/second to 0.3 m/second, or from 0.05 m/second to 0.6 m/second, or from 0.05 m/second to 1 m/second, or from 0.1 m/second to 1.5 m/second.

In an embodiment, the amount of the first olefin, also referred to as the first polymer component, relative to the second olefin, also referred to as the second polymer component, may vary widely depending on the nature of the component polymers and intended end uses of the polymer blend. Accordingly, one advantage of the instant process is the ability to be able to produce a polymer blend in which a lower crystallinity polymer comprises more than 20%, such as more than 50%, for example, more than 70% of the total reactor polymer blend.

It has been discovered that the amount of the first polymer relative to the second polymer component mainly depends on the gas holdup. Gas holdup is low in the homogeneous regime. Gas holdup depends mainly on superficial gas velocity. For both bubble columns and slurry bubble columns, gas holdup has been found to increase with increasing superficial gas velocity. This increase has been found to be proportional to superficial gas velocity in the bubbly flow regime. For the churn turbulent regime, the effect of superficial velocity on gas holdup is less pronounced. In an embodiment, the bubble column reactor has a gas holdup of 10% or more, or 15% or more. In another embodiment, the gas holdup is in a range of 20% to 35% for both bubble column and slurry column processes.

In an embodiment, the molecular weight of each component in the reactor polymer blend can be optimized for a specific application. Generally, the molecular weight of the high crystalline component should be greater than the entanglement molecular length, while the molecular weight of the less crystalline or amorphous component should be long enough so the crystalline component can bind the polymer segments together into a physical network in the solid state. When the molecular weight of the first polymer is low, the second polymer should have higher molecular weight to attain good mechanical strength. Higher molecular weight component can be produced in either the bubbling region or the liquid/slurry region. For most catalyst, the propagation rate in the polymerization increases with monomer concentration. Higher molecular weight component can be produced in a region with higher monomer concentration.

In an embodiment, hydrogen, if present in the polymerization reactor, is present at any level that will achieve the desired melt index (MI or I2) or melt flow rate (MFR) and molecular weights of the high and the low molecular weight component. Due to preferential distribution of H2 between the liquid or slurry region and bubble region, the effects of H2 on molecular weight are more significant in the bubble region. Addition of H2 further enhances the difference of molecular weight of polymers produced in the bubble region and liquid region. Molecular weight or MI or MFR can thus be influenced by the hydrogen concentration. The amount of hydrogen in the polymerization can be expressed as a molar ratio relative to the total polymerizable monomer, for example, ethylene, or a blend of ethylene and another alpha olefin. The amount of hydrogen used in the polymerization processes of the present disclosure is an amount necessary to achieve the desired molecular weight of the final polyolefin resin.

In one embodiment, the ratio of hydrogen to total ethylene monomer (mol ppm H2:mol % ethylene) in the circulating gas stream is in a range of from 0 to 100, in a range of from 0.05 to 50 in another embodiment, in a range of from 0.10 to 40 in even another embodiment, and in a range of from 0.15 to 35 in still another embodiment. Circulating gas stream includes gas from the fresh feed and gas from the recycle stream.

In one embodiment, the invented polymerization process is operated in a solution process. A solution polymerization is defined as a process in which the polymers produced remain dissolved in a liquid polymerization medium such as an inert solvent or monomer(s) or their mixtures. A solution polymerization is typically a homogeneous liquid polymerization system. For a bubble column type of reactor, a solution process means that the polymer produced is dissolved in the liquid phase under the polymerization condition. Often, the catalyst and monomer are also dissolved in the polymerization medium, but that is not a requirement of a "solution" process. In typical solution processes, the polymerization temperature and/or pressure is above the cloudy point.

In an embodiment, the polymerization process conditions are sufficient to maintain the polymerization system in a solution state. For example, the minimum reaction temperature and pressure are selected so that the polymers produced are dissolved in the liquid medium, i.e., above the polymerization system's cloud point and above its solid-fluid phase transition temperature and pressure with that polymer. Furthermore, for solution polymerization processes, the lower limits of reaction temperature can also be determined by the solid-fluid phase transition temperature. Reactors operated below the solid-fluid phase transition temperature of the reaction mixture can lead to operation problems due to fouling. The application of certain inert solvents can further reduce the minimum operation temperature of the fouling-free operation regime, although the substantial presence of inert solvents can reduce polymerization rate and product molecular weight. The upper limit for temperature can be determined by the product properties that are strongly influenced by the reaction temperature. Since often polymers with higher molecular weights and/or higher melting temperatures are desired, high polymerization temperatures (>200° C.) are generally not advantageous. Increased temperatures can also degrade many catalytic systems, providing another reason for avoiding excessive polymerization temperatures. From this perspective, temperatures below 250° C. are useful. Useful reactor conditions are influenced by the product specifications and reactor operation issues as outlined above. Advantageously, the polymerization temperatures for high crystalline polymers are typically between 90° C. and 200° C., or between 90° C. and 180° C., or between 90° C. and 150° C., or between 90° C. and 140° C., or between 95° C. and 140° C. For low crystalline or amorphous polymers, the reaction temperatures can be much lower.

Polymers with low crystallinity or low melting temperature are often produced in a solution process due to the selected operating windows optimized for catalyst and process economics. In the course of finishing, unreacted monomers and solvent are removed from the polymerization mixture until polymer can form solid pellets or bales. The unreacted monomers and solvent can be recycled back to the reactor.

Any form of catalyst including homogenous catalysts and supported catalysts can be used in the solution process. In an embodiment, homogenous catalysts are employed in the solution process.

Many polymers are insoluble in the reaction medium from which they are formed. Upon significant polymerization, polymer chains reach a crystallizable length and polymer nucleation and crystallization begin. The crystallization of polymers leads to polymer-solvent phase separation. A slurry process, in an embodiment, is conducted in a diluent in which the catalyst is affixed to support, and the polymer formed during production remains suspended in the liquid medium, never dissolving. The diluent can be an inert solvent (diluent), monomer(s), or their mixture. In an embodiment, polymer-solvent phase separation can be also induced through mismatch of solvency of the reaction medium with respect to the polymer produced. For the purpose of this invention and the claims thereto, the slurry process includes the polymerization in which the polymer produced is phase separated from the liquid medium and is suspended in the liquid medium in a form of droplets or solid particles. A slurry process includes also the suspension process. For a slurry column type of reactor, a slurry process means that at least part of the polymers produced is in a form of particulate, solid forms embedded in the liquid polymerization medium. In slurry (suspension) polymerization process monomers, such as ethylene or propylene, are partially dissolved in an organic reaction medium and then contacted with a catalyst. The polyethylene or polypropylene formed resides in the liquid medium in a form of particulate or suspension. Polymers produced in the bubble region are intimately mixed with the polymers formed in the liquid medium due to interactions between bubbles and slurry medium. In another embodiment, the invented polymerization process is operated in a slurry process.

In one embodiment, the polymerization occurs below the crystallization temperature of the polymer produced in the hydrocarbon diluent.

In one or more embodiments, the reaction temperature and/or pressure are selected so that the polymerization system remains at a pressure and/or a temperature below the polymer's cloud point in a particular polymerization system, resulting in a two-phase polymerization system forming a polymer-rich phase and a polymer-lean phase. The polymer-rich phase (also referred as to suspension) contains most of polymer produced, while the polymer-lean phase comprises most of the solvent and monomers.

Any form of catalyst, including homogenous catalysts and supported catalysts, can be used in the slurry process. In an embodiment, supported catalysts are employed in the solution process.

In an embodiment, the process described herein can be used for the polymerization of one or more olefin monomers having from 2 to 30 carbon atoms, or 2 to 12 carbon atoms, or 2 to 8 carbon atoms. Useful monomers include linear, branched, or cyclic olefins; linear, branched, or cyclic alpha olefins; linear, branched, or cyclic diolefins; linear, branched, or cyclic alpha-omega diolefins; and linear, branched, or cyclic polyenes. In an embodiment, monomers include one or more of ethylene, propylene, butene-1, pentene-1,4-methyl-pentene-1, hexene-1, octene-1, decene-1,3-methyl-pentene-1, norbornene, norbornadiene, vinyl norbornene, and ethylidene norbornene monomers.

In one embodiment, the process of this invention relates to the homo-polymerization of ethylene or the copolymerization of ethylene with at least one comonomer having from 3 to 12 carbon atoms, or 4 to 8 carbon atoms. Particularly, the comonomers are propylene, butene-1,4-methyl-pentene-1,3-methyl-pentene-1, hexene-1 and octene-1, the more preferred being hexene-1, butene-1 and octene-1. In an embodiment, the comonomer(s) are present in the ethylene copolymer at from 0.1 to 50 mol %, more or 1 to 30 mol %, or 1 to 20 mol %.

In an embodiment, the process relates to the homo-polymerization of propylene or the copolymerization of propylene. In the case of copolymerization, the comonomer of the copolymer is ethylene and/or a $C_4$ to $C_{20}$ linear, branched, or cyclic monomer, and, in one embodiment, is a $C_4$ to $C_{12}$ linear or branched alpha-olefin, or butene-1, pentene-1, hexene-1, heptene-1, octene-1, nonene, decene, dodecene, 4-methyl-pentene-1,3-methyl pentene-1,3,5,5-trimethyl-hexene-1, and the like. In an embodiment, the comonomer is present from 0.5 to 99 mol %, or from 1 to 60 mol %, or from 1 to 50 mol %, or from 1 to 35 mol %, or from 2 to 30 mol %, or from 2 to 25 mol %, or from 2 to 15 mol %, based on the entire polymer.

In an embodiment, the polymer produced herein is a homopolymer or copolymer of one or more linear or branched $C_3$ to $C_{30}$ prochiral alpha-olefins or $C_5$ to $C_{30}$ ring containing olefins or combinations thereof capable of being polymerized by either stereospecific and non-stereospecific catalysts. Prochiral, as used herein, refers to monomers that favor the formation of isotactic or syndiotactic polymer when polymerized using stereospecific catalyst(s).

In an embodiment, the monomer to be polymerized comprises aromatic-group-containing monomers containing up to 30 carbon atoms. Suitable aromatic-group-containing monomers comprise at least one aromatic structure, or from one to three, or a phenyl, indenyl, fluorenyl, or naphthyl moiety. The aromatic-group-containing monomer further comprises at least one polymerizable double bond such that after polymerization, the aromatic structure will be pendant from the polymer backbone. The aromatic-group containing monomer may further be substituted with one or more hydrocarbyl groups including but not limited to $C_1$ to $C_{10}$ alkyl groups. Additionally, two adjacent substitutions may be joined to form a ring structure. Preferred aromatic-group-containing monomers contain at least one aromatic structure appended to a polymerizable olefinic moiety. Particularly preferred aromatic monomers include styrene, alpha-methylstyrene, para-alkylstyrenes, vinyltoluenes, vinylnaphthalene, allyl benzene, and indene, especially styrene, paramethyl styrene, 4-phenyl-1-butene, and allyl benzene.

Non-aromatic cyclic group containing monomers are also useful monomers herein. These monomers can contain up to 30 carbon atoms. Suitable non-aromatic cyclic group containing monomers have at least one polymerizable olefinic group that is either pendant on the cyclic structure or is part of the cyclic structure. The cyclic structure may also be further substituted by one or more hydrocarbyl groups such as, but not limited to, $C_1$ to $C_{10}$ alkyl groups. In an embodiment, non-aromatic cyclic group containing monomers include vinylcyclohexane, vinylcyclohexene, vinylnorbornene, ethylidene norbornene, cyclopentadiene, cyclopentene, cyclohexene, cyclobutene, vinyladamantane, and the like.

In an embodiment, diolefin monomers useful in this invention include any hydrocarbon structure, or $C_4$ to $C_{30}$, having at least two unsaturated bonds, wherein at least two of the unsaturated bonds are readily incorporated into a polymer. It is further preferred that the diolefin monomers be selected from alpha, omega-diene monomers (i.e., di-vinyl monomers). In an embodiment, the diolefin monomers are linear di-vinyl monomers, or those containing from 4 to 30 carbon atoms. Examples of dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Cyclic dienes include cyclopentadiene, vinylnorbornene, norbornadiene, ethylidene norbornene, divinylbenzene, dicyclopentadiene, or higher ring containing diolefins with or without substituents at various ring positions.

In an embodiment, one or more dienes are present in the ethylene and/or propylene-based polymer produced herein at up to 10 wt %, or at 0.00001 wt % to 1.0 wt %, or 0.002 wt % to 0.5 wt %, or 0.003 wt % to 0.2 wt %, based upon the total weight of the polymer. In an embodiment, 500 ppm or less of diene is added to the polymerization, or 400 ppm or less, or 300 ppm or less, based upon the total weight of the polymer. In an embodiment, at least 50 ppm of diene is added to the polymerization, or 100 ppm or more, or 150 ppm or more, based upon the total weight of the polymer.

In another embodiment, ethylene and/or propylene is/are polymerized with at least two different comonomers to form a terpolymer. Suitable comonomers include a combination of alpha-olefin monomers having 4 to 10 carbon atoms, or 4 to 8 carbon atoms, optionally with at least one diene monomer. In an embodiment, terpolymers include ethylene/butene-1/hexene-1, ethylene/propylene/butene-1, propylene/ethylene/hexene-1, ethylene/propylene/octene-1, ethylene/propylene/norbornene, and the like.

Any known solvent for the reaction mixture that is effective for the purpose can be used in conducting polymerizations in accordance with the present invention. For example, suitable solvents would be hydrocarbon solvents such as aliphatic, cycloaliphatic and aromatic hydrocarbon solvents, or halogenated versions of such solvents. In an embodiment, solvents are $C_{12}$ or lower, straight chain or branched chain, saturated hydrocarbons, $C_5$ to $C_9$ saturated alicyclic or aromatic hydrocarbons or $C_2$ to $C_6$ halogenated hydrocarbons. In an embodiment, solvents include $C_{12}$ or lower, linear chain or branched chain hydrocarbons, hexane, and methyl cyclopentane. Non-limiting illustrative examples of solvents are butane, pentane, hexane, heptane, cyclopentane, cyclohexane, cycloheptane, methyl cyclopentane, methyl cyclohexane, isooctane, benzene, toluene, xylene, chloroform, chlorobenzenes, tetrachloroethylene, dichloroethane, and trichloroethane.

Optimized polymerization systems include proper selection of solvent (or diluents) and monomers under a specific pressure and temperature for desired products. Combinations of high boiling point solvent with a low boiling point monomer allow the system to have high gas throughput and wide range selection of system pressure and temperature. For a system with selected solvent and monomers, temperature and pressure of polymerization system determines the concentration of low boiling monomer in the liquid or liquid-solid region as well as the bubble region.

Temperature employed in the reactor is not limited, provided that it is suitable for the polymerization with a given type of catalysts system. The selection of temperature depends on the reactants and solvents employed, and monomer concentration, among other factors. Temperature has influence on the solubility of reactant in the liquid phase and reactant concentration in the gas bubble phase. In general, the solubility is higher at lower temperature. Thus, the choices of solvent and temperature are not independent.

Operating temperature and pressure need to be in a range so that at least the lowest boiling component is in gas phase and presence partially in the bubble region. The boiling point of most hydrocarbons is readily available in literature. In another embodiment, the operating temperature and pressure need to be in a range so that the temperature needs to be above the bubbling point and the pressure needs to be lower than the bubbling point of the liquid mixture. For most hydrocarbon mixtures, the bubbling point and dew point can be calculated using the thermodynamic principle or measured directly.

In one embodiment, the process may be used to produce ethylene polymer blends. The reactor blends, in an embodiment, can be produced by contacting ethylene and one or more monomers selected from $C_3$ to $C_{20}$ alpha-olefins. Under certain operating conditions, part of ethylene may be dissolved in an inert solvent or diluent with the remaining ethylene being present in the gas bubble region. Ethylene concentration in the bubble region may be relatively higher than that in the liquid region. Polymers produced in the gas bubble region have higher ethylene content than that polymerized in the liquid region, depending on the catalyst employed. Higher density polymer is mainly produced in the bubble region. In one embodiment, the polymer produced in the gas bubble region has a density of 0.91 g/cm$^3$ or higher and the polymer produced in the liquid (or liquid-solid) region has a density of 0.90 g/cm$^3$ or less. In an embodiment, the densities of the two polymer components differ at least by 1%, or by at least 2%, or by at least 3%, based on the density of the higher density component. In another embodiment, the polymer produced in the gas bubble region has a density of 0.93 g/cm$^3$ or higher and the polymer produced in the liquid (or liquid-solid) region has a density of 0.92 g/cm$^3$ or less, wherein the density is determined according to ASTM D1505.

In an embodiment, the difference in ethylene content between the two components is such that the component produced in the gas bubbles has a density in a range from 0.91 to 0.96 g/cm$^3$ and the component formed in the liquid or liquid slurry region has a density in a range of 0.86 to 0.92 g/cm$^3$, and/or the polymer blend has at least two melting peaks on the same heating cycle of DSC measurement using the procedure described blow. In an embodiment, the difference between the two peak melting temperatures is 20° C. or more, or 30° C. or more, or 35° C. or more.

In an embodiment, the content of comonomer such as butene-1, hexene-1, or octene-1 in the polymer produced in the liquid or liquid solid slurry region is higher than that for polymer produced in the gas bubble region. In an embodiment, the polymer produced in the liquid region has comonomer content in a range from about 4 wt % to 25 wt %. In another embodiment, the comonomer contents of the polymers produced in the gas bubble region and in the liquid region differ at least by 1 wt %, or by at least 2 wt %, or by at least 3 wt %, based on the wt % comonomer in the higher-comonomer content polymer.

In ethylene polymerization according to one or more embodiments disclosed herein, ethylene concentration employed in the liquid region can reach to the maximum concentration at saturation condition as compared to 4 wt % to 7 wt % in the known slurry or solution process where the ethylene must be completely dissolved in the liquid medium under given operating pressures and temperatures. For most catalyst systems in embodiments, higher monomer concentration means higher polymerization rate per unit reactor volume and higher molecular weight of the polymer produced.

For most catalysts in embodiments, the polymer molecular weight depends at least in part on the concentration of monomer and $H_2$, when present. It has been discovered that preferential distribution of $H_2$ and ethylene between the liquid region and gas bubble region may lead to greater difference in molecular weight for the polymers produced in the liquid (or liquid-slurry) region and gas bubble region. Under operating conditions according to the instant disclosure, the increase in molecular weight due to the increase in ethylene concentration in the bubble region may be balanced out by the decrease in molecular weight due to the increase of $H_2$ concentration in the gas bubble region.

Ethylene polymers can be produced in the slurry process in embodiments. Solvent with low solvency to polyethylene is preferred as a diluent. Different diluents have different solvency ability to the ethylene polymer produced. It has been discovered that the lower molecular weight of a linear alkane diluent in embodiments, the lower is the solvency for polyethylene. Branching of linear alkane may also reduce its solvency power. It has further been discovered that the lower the molecular weight of a diluent, the lower the boiling point. Choice of diluent also affects the composition in the gas bubbles and the composition of polymer produced in the bubble region. In an embodiment, diluents suitable for use herein include $C_1$ to $C_{20}$ alkanes, or isobutane, pentanes, hexanes, and/or heptanes. For ethylene copolymer production with $C_3$ to $C_{20}$ alpha-olefins, it has been discovered that higher density polymer is produced in the bubble region than that produced in the slurry region.

For polymerization of ethylene in a slurry process, preferably, the temperature is in a range from 50° C. to 120° C., or from 70° C. to 110° C., or from 70° C. to 100° C., wherein the temperature and pressure are selected to be below the cloud point.

In one embodiment, polymerization of ethylene is carried out at a temperature ranged from 70° C. to 90° C. and a pressure below 40 MPa in the slurry reactor. Isobutane can be used as the diluent. The reaction temperature is controlled by removing the heat of polymerization through the cooling jacket. A slurry product is continuously removed from the reactor (e.g., through a pressure control valve). The slurry contains about 55 wt % or less of solid polymer produced.

The process according to embodiments herein may also be used for ethylene polymerization in a solution process. Choice of temperature and pressure depends on the type of solvent and density of polymer produced. High density polyethylene (HDPE) has a melting point of above 135° C. At ambient condition, HDPE does not dissolve in most of the hydrocarbon solvents. HDPE does dissolve in hydrocarbon of sufficient molecular weight at the solubility point. For a solution process, the temperature must be high enough to prevent polymer from crystallizing in the liquid region. For example, in typical solution polyethylene processes, polymerization takes place in a hydrocarbon solvent at temperatures above the melting point of the polymer produced and the polymer is typically recovered by vaporization of the solvent and any unreacted monomer. In one embodiment, the temperature is about 100° C. or more, or 120° C. or more, or 150° C. or more. For HDPE, polymerization temperature may be in a range from about 150° C. to 250° C.

In one embodiment, ethylene polymerization can be carried out in continuous process. Ethylene and comonomer such as 1-butene, 1-hexene and 1-octene can be introduced into the reactor in either gas phase or liquid form. The reactor can be operated at a temperature ranged from about 100° C. to 250° C. and a pressure below 3 MPa. Suitable solvents include isoparaffin solvent (a mixture of $C_8$ and $C_9$ isoparaffins), cyclohexane and/or methylpentane. Gas bubbles are introduced to create good mixing in the reactor. Use of mechanical mixing and baffles may further enhance the mixing of reaction medium. In one embodiment, the reactor includes mechanical mixing devices and/or baffles. Good mixing and rapid reaction make it possible to use short residence time such that reactors operate at relatively high production rates and efficiencies. In an embodiment, the reactor configuration may include a single reactor or multiple reactors in series and/or in parallel. In one embodiment, the average residence time in each reactor is in a range from about 2 to 60 minutes.

In an embodiment, the process disclosed herein may be used to produce propylene polymers. The reactor blends can be produced by contacting propylene and one or more monomers selected from ethylene or $C_4$ to $C_{20}$ alpha-olefins. In an embodiment, operating conditions are selected such that a portion of the propylene is dissolved in an inert solvent or diluent and the remaining propylene is present in the gas bubble region. The concentration of ethylene (if present) and propylene in the bubble region is different from that in the liquid or liquid slurry region. Polymers produced in the gas bubble region have different propylene content from that polymerized in the liquid region, depending on the catalyst employed. For ethylene/propylene copolymers, higher ethylene content polymer is mainly produced in the bubble region. For propylene/butane and propylene/hexene copolymers, the polymer produced in the bubble region has higher propylene content than that produced in the liquid region. Molecular weight of the polymers produced in the bubble region is different from that produced in the liquid or liquid solid slurry region due to the difference in reaction environment. For homo-polypropylene, the blend may comprise two polypropylene components with different molecular weight distributions.

In one embodiment, propylene polymerization is used in a continuous slurry process. The polymerization temperature is below the cloud point of the polymerization system, and/or the temperature is below the melting point, and/or the temperature is below the crystallization point of the polymer so that the polymer forms as solid particles suspended in the hydrocarbon diluent. Polymerization pressure depends on the chemical compositions in the polymerization medium. In an embodiment, the pressure is selected to be low enough so that at least one of the monomers is present in the bubble region.

The instant process can also be used for propylene polymerization in a solution process. For the production of highly crystalline polypropylenes (melting peak temperatures >150° C.) in solution polymerization processes, the minimum operating temperature is about 100° C.

In an embodiment, semi-crystalline propylene copolymers are produced in a solution process according to one or more embodiments disclosed herein. Semi-crystalline propylene copolymers may have a comonomer content ranging from 2 wt % to 20 wt %. Amorphous propylene copolymer may also be produced in a solution process according to one or more embodiments disclosed herein. Ethylene propylene copolymers are generally amorphous at ethylene contents between 20 wt % and 70 wt % when the polymer is produced in a homogeneous polymerization condition using a single catalyst. If a polymer component with ethylene crystallinity is desired in the blend, it may comprise in excess of 60 wt % ethylene. If a component is desired with propylene crystallinity, it may have less than about 30 wt % ethylene in an embodiment. Furthermore, in this case, in an embodiment, one may use a catalyst system that is capable of polymerizing propylene stereospecifically. Catalyst systems that produce isotactic propylene sequences may be suitable for use.

In an embodiment, the process disclosed herein may be used to produce oligomers of any of the monomers listed above. Suitable oligomers include oligomers of any $C_2$ to $C_{20}$ olefins, or $C_2$ to $C_{12}$ alpha-olefins, or ethylene, propylene and/or butene. In an embodiment, the feedstock for the oligomerization process is ethylene. In an alternative embodiment, other alpha-olefins including, but not limited to, propylene and 1-butene, may also be used alone or combined with ethylene. For oligomerization according to the instant disclosure, ethylene may be fed into the bubble column reactor in the gas phase. Oligomerization reaction takes place in both the bubble region and the liquid region depending on the catalyst employed. Inert gas can also be used in the bubble phase to adjust the flow pattern for an optimized reaction condition.

The polymerization process of this invention can be applied to any appropriate polymerization known in art. These processes can be operated in either a continuous process or in a batch process. In a continuous solution operation process, both gas and solution (containing solvent and polymer produced) flow concurrently upward in the column. The superficial velocity of the solution phase is lower than the gas superficial velocity. In an embodiment, the superficial velocity of the solution phase is lower than the gas superficial velocity by at least an order of magnitude. Likewise, for a continuous slurry operation process, both gas and liquid diluent flow concurrently upward in the column. The diluent superficial velocity is lower than the gas superficial velocity. In an embodiment, the diluent superficial velocity is lower than the gas superficial velocity by at least an order of magnitude. The polymer particles produced are suspended in the diluent and can be either stationary or flow concurrently upward with diluent. Polymer produced alone with polymerization medium is discharged from the column. In a batch mode operation, the slurry suspension or the solution is stationary, meaning no continuous flow into or discharge from the reactor. The gaseous components are bubbled upward into the reactor. In an embodiment, the length-to-diameter ratio, or aspect ratio, of the column is at least 5.

The polymer product can be recovered from solution at the completion of the polymerization by any of the techniques well known in the art such as steam stripping followed by extrusion drying or by devolatilizing extrusion. Separated solvent/diluent and monomers can be recycled back in the reactor.

The polymerization processes disclosed herein may have residence times in the reactors as short as 0.1 minutes or 5 minutes and as long as several hours, alternatively from 5 minutes to 120 minutes, alternatively from 10 to 60 minutes, alternatively from 15 to 30 minutes.

Temperature control in the reactor is generally obtained by balancing the heat of polymerization with reactor cooling. Reactors can be cooled by reactor jackets or cooling coils, auto-refrigeration, pre-chilled feeds, or combinations of all three. Careful selection of solvent or diluent is required to match with the operating pressure and temperature for an auto-refrigerated reactor cooling system. Gaseous components from the vaporization will also alter the composition profile in the bubble region. Adiabatic reactors with pre-chilled feeds are suitable for use herein.

Polymerizations can be carried out either in a single reactor, or in two or more reactors configured in series or parallel. In any operation mode, the catalyst system may comprise one or more than one catalyst precursor and one or more activator. In both single- and multi-reactor operations, the one or more catalyst systems may be introduced at one point or at multiple points to the one or more polymerization reactors. Various feed configurations can be used depending on such factors as the desired product properties, such as, for example, molecular weight distribution, or catalyst stability. Such feed configurations are well known in the art of chemical engineering and can be readily optimized for the desired production scale and product properties using known engineering techniques. Accordingly, in an embodiment, the bubble column reactor system comprises a plurality of bubble columns arranged in serial communication, parallel communication, or a combination thereof. Each may operate under the same operational conditions (e.g., temperature, pressure, bubble rate, agitation, residence time, and the like), different operational conditions, utilizing the same or different catalysts, monomers, comonomers, and/or the like.

All polymerization catalysts including conventional-type transition metal catalysts are suitable for use in the polymerization process of the invention. The following is a non-limiting discussion of the various polymerization catalysts useful in the process of the invention.

Conventional-type transition metal catalysts are those traditional Ziegler-Natta catalysts and Phillips-type chromium catalyst well known in the art. Examples of conventional-type transition metal catalysts are discussed in U.S. Pat. Nos. 4,115,639; 4,077,904; 4,482,687; 4,564,605; 4,721,763; 4,879,359; and 4,960,741, all of which are herein fully incorporated by reference. The conventional-type transition metal catalyst compounds that may be used in the present invention include transition metal compounds from Groups 3 to 10, or 4 to 6 of the Periodic Table of Elements.

These conventional-type transition metal catalysts may be represented by the formula:

$$MR_x \quad (I)$$

where M is a metal from Groups 3 to 10, or Group 4, or titanium; R is a halogen or a hydrocarbyloxy group; and x is the valence of the metal M, or x is 1, 2, 3, or 4, or x is 4. Non-limiting examples of R include alkoxy, phenoxy, bromide, chloride and fluoride. Non-limiting examples of conventional-type transition metal catalysts where M is titanium include $TiCl_3$, $TiCl_4$, $TiBr_4$, $Ti(OC_2H_5)_3Cl$, $Ti(OC_2H_5)_3Cl_3$, $Ti(OC_4H_9)_3Cl$, $Ti(OC_3H_7)_2Cl_2$, $Ti(OC_2H_5)_2Br_2$, $TiCl_3.1/3AlCl_3$, and $Ti(OC_{12}H_{25})Cl_3$.

Conventional-type transition metal catalyst compounds based on magnesium/titanium electron-donor complexes that are useful in the invention are described in, for example, U.S. Pat. Nos. 4,302,565 and 4,302,566, which are herein fully incorporate by reference. The $MgTiCl_6$ (ethyl acetate)$_4$ derivative is particularly preferred. British Patent Application 2,105,355, herein incorporated by reference, describes various conventional-type vanadium catalyst compounds. Non-limiting examples of conventional-type vanadium catalyst compounds include vanadyl trihalide, alkoxy halides and alkoxides such as $VOCl_3$, $VOCl_2(OBu)$ where Bu is butyl and $VO(OC_2H_5)_3$; vanadium tetra-halide and vanadium alkoxy halides such as $VCl_4$ and $VCl_3(OBu)$; vanadium and vanadyl acetyl acetonates and chloroacetyl acetonates such as $V(AcAc)_3$ and $VOCl_2(AcAc)$ where (AcAc) is an acetyl acetonate. The preferred conventional-type vanadium catalyst compounds are $VOCl_3$, $VCl_4$, and $VOCl_2$—OR where R is a hydrocarbon radical, or a $C_1$ to $C_{10}$ aliphatic or aromatic hydrocarbon radical such as ethyl, phenyl, isopropyl, butyl, propyl, n-butyl, iso-butyl, tertiary-butyl, hexyl, cyclohexyl, naphthyl, etc., and vanadium acetyl acetonates.

Conventional-type chromium catalyst compounds, often referred to as Phillips-type catalysts, suitable for use in the present invention include $CrO_3$, chromocene, silyl chromate, chromyl chloride ($CrO_2Cl_2$), chromium-2-ethyl-hexanoate, chromium acetylacetonate ($Cr(AcAc)_3$), and the like. Non-limiting examples are disclosed in U.S. Pat. Nos. 2,285,721; 3,242,099; and 3,231,550, which are herein fully incorporated by reference.

Still other conventional-type transition metal catalyst compounds and catalyst systems suitable for use in the present invention are disclosed in U.S. Pat. Nos. 4,124,532; 4,302,565; 4,302,566; 5,763,723; published EP-A2 0 416 815; and EP-A1 0 420 436, which are all herein incorporated by reference.

The conventional-type transition metal catalysts of the invention may also have the general formula:

$$M'_tM''X_{2t}Y_uE \quad (II)$$

where M' is Mg, Mn and/or Ca; t is a number from 0.5 to 2; M'' is a transition metal such as Ti, V, and/or Zr; X is a halogen, or Cl, Br, or I; Y may be the same or different and is halogen, alone or in combination with oxygen, $-NR_2$, $-OR$, $-SR$, $-COOR$, or $-OSOOR$, where R is a hydrocarbyl radical, in particular an alkyl, aryl, cycloalkyl or arylalkyl radical, acetylacetonate anion in an amount that satisfies the valence state of M'; u is a number from 0.5 to 20; E is an electron donor compound selected from the following classes of compounds: (a) esters of organic carboxylic acids, (b) alcohols, (c) ethers, (d) amines, (e) esters of carbonic acid, (f) nitriles, (g) phosphoramides, (h) esters of phosphoric and phosphorus acid, and (i) phosphorus oxy-chloride. Non-limiting examples of complexes satisfying the above formula include: $MgTiCl_5.2CH_3COOC_2H_5$, $Mg_3Ti_2—Cl_{12}.7CH_3COOC_2H_5$, $MgTiCl_5.6C_2H_5OH$, $MgTiCl_5.100CH_3OH$, $MgTiCl_5$.tetrahydrofuran, $MgTi_2Cl_{12}.7C_6H_5CN$, $Mg_3Ti_2Cl_{12}.6C_6H_5COOC_2H_5$, $MgTiCl_6.2CH_3COOC_2H_5$, $MgTiCl_6.6C_5H_5N$, $MnTiCl_5.4C_2H_5OH$, $MgTiCl_5(OCH_3)$ $.2CH_3COOC_2H_5$, $MgTiCl_5N(C_6H_5)_2.3CH_3COOC_2H_5$, $MgTiBr_2Cl_4.2(C_2H_5)_2O$, $Mg_3V_2Cl_{12}.7CH_3—COOC_2H_5$, $MgZrCl_6.4$ tetrahydrofuran. Other catalysts may include cationic catalysts such as $AlCl_3$ and other cobalt and iron catalysts well known in the art.

Typically, these conventional-type transition metal catalyst compounds (excluding some conventional-type chromium catalyst compounds) are activated with one or more of the conventional-type cocatalysts described below.

Conventional-type cocatalyst compounds for the above conventional-type transition metal catalyst compounds may be represented by the formula:

$$M^3M^4_vX^2_cR^3_{b-c} \quad (III)$$

wherein $M^3$ is a metal from Group 1, 2, 12, and 13 of the Periodic Table of Elements; $M^4$ is a metal of Group IA of the Periodic Table of Elements; v is a number from 0 to 1; each $X^2$ is any halogen; c is a number from 0 to 3; each $R^3$ is a monovalent hydrocarbon radical or hydrogen; b is a number from 1 to 4; and wherein b minus c is at least 1.

Other conventional-type organometallic cocatalyst compounds for the above conventional-type transition metal catalysts have the formula:

$$M^3R^3_k \qquad (IV)$$

where $M^3$ is a Group 1, 2, 12, or 13 metal, such as lithium, sodium, beryllium, barium, boron, aluminum, zinc, cadmium, and gallium; k equals 1, 2, or 3 depending upon the valency of $M^3$ which valency in turn normally depends upon the particular Group to which $M^3$ belongs; and each $R^3$ may be any monovalent hydrocarbon radical.

Non-limiting examples of conventional-type organometallic cocatalyst compounds of Groups 1, 2, 12, and 13 useful with the conventional-type catalyst compounds described above include methyllithium, butyllithium, dihexylmercury, butylmagnesium, diethylcadmium, benzylpotassium, diethylzinc, tri-n-butylaluminum, diisobutyl ethylboron, diethylcadmium, di-n-butylzinc, and tri-n-amylboron, and, in particular, the aluminum alkyls, such as tri-hexyl-aluminum, triethylaluminum, trimethylaluminum, and tri-isobutylaluminum. Other conventional-type cocatalyst compounds include mono-organohalides and hydrides of Group 2 metals, and mono- or di-organohalides and hydrides of Group 13 metals. Non-limiting examples of such conventional-type cocatalyst compounds include di-isobutylaluminum bromide, isobutylboron dichloride, methyl magnesium chloride, ethylberyllium chloride, ethylcalcium bromide, di-isobutylaluminum hydride, methylcadmium hydride, diethylboron hydride, hexylberyllium hydride, dipropylboron hydride, octylmagnesium hydride, butylzinc hydride, dichloroboron hydride, di-bromo-aluminum hydride, and bromocadmium hydride. Conventional-type organometallic cocatalyst compounds are known to those in the art, and a more complete discussion of these compounds may be found in U.S. Pat. Nos. 3,221,002 and 5,093,415, which are herein fully incorporated by reference.

Generally, polymerization catalysts useful in the invention include one or more bulky ligand metallocene compounds (also referred to herein as metallocenes). Typical bulky ligand metallocene compounds are generally described as containing one or more bulky ligand(s) and one or more leaving group(s) bonded to at least one metal atom. The bulky ligands are generally represented by one or more open, acyclic, or fused ring(s) or ring system(s) or a combination thereof. These bulky ligands, or the ring(s) or ring system(s) are typically composed of atoms selected from Groups 13 to 16 atoms of the Periodic Table of Elements; or the atoms are selected from the group consisting of carbon, nitrogen, oxygen, silicon, sulfur, phosphorous, germanium, boron and aluminum or a combination thereof. Most of the ring(s) or ring system(s) are composed of carbon atoms such as, but not limited to, those cyclopentadienyl ligands or cyclopentadienyl-type ligand structures or other similar functioning ligand structure such as a pentadiene, a cyclooctatetraendiyl or an imide ligand. The metal atom is selected from Groups 3 through 15 and the lanthanide or actinide series of the Periodic Table of Elements. In an embodiment, the metal is a transition metal from Groups 4 through 12, or Groups 4, 5, and 6, or the transition metal is from Group 4.

Exemplary of these bulky ligand metallocene-type catalyst compounds and catalyst systems are described in, for example, U.S. Pat. Nos. 4,530,914; 4,871,705; 4,937,299; 5,017,714; 5,055,438; 5,096,867; 5,120,867; 5,124,418; 5,198,401; 5,210,352; 5,229,478; 5,264,405; 5,278,264; 5,278,119; 5,304,614; 5,324,800; 5,347,025; 5,350,723; 5,384,299; 5,391,790; 5,391,789; 5,399,636; 5,408,017; 5,491,207; 5,455,366; 5,534,473; 5,539,124; 5,554,775; 5,621,126; 5,684,098; 5,693,730; 5,698,634; 5,710,297; 5,712,354; 5,714,427; 5,714,555; 5,728,641; 5,728,839; 5,753,577; 5,767,209; 5,770,753; and 5,770,664; all of which are herein fully incorporated by reference. Also, the disclosures of European publications EP-A-0 591 756, EP-A-0 520 732, EP-A-0 420 436, EP-B10 485 822, EP-B1 0 485 823, EP-A2-0 743 324, and EP-B1 0 518 092 and PCT publications WO 91/04257, WO 92/00333, WO 93/08221, WO 93/08199, WO 94/01471, WO 96/20233, WO 97/15582, WO 97/19959, WO 97/46567, WO 98/01455, WO 98/06759, and WO 98/011144 are all herein fully incorporated by reference for purposes of describing typical bulky ligand metallocene-type catalyst compounds and catalyst systems.

In one embodiment, the catalyst composition of the invention includes one or more bulky ligand metallocene catalyst compounds represented by the formula:

$$L^A L^B MQ_n \qquad (V)$$

where M is a metal atom from the Periodic Table of the Elements and may be a Group 3 to 12 metal or from the lanthanide or actinide series of the Periodic Table of Elements, or M is a Group 4, 5, or 6 transition metal, or M is a Group 4 transition metal, even or M is zirconium, hafnium or titanium. The bulky ligands, $L^A$ and $L^B$, are open, acyclic or fused ring(s) or ring system(s) and are any ancillary ligand system, including unsubstituted or substituted, cyclopentadienyl ligands or cyclopentadienyl-type ligands, heteroatom substituted and/or heteroatom containing cyclopentadienyl-type ligands. Non-limiting examples of bulky ligands include cyclopentadienyl ligands, cyclopentaphenanthreneyl ligands, indenyl ligands, benzindenyl ligands, fluorenyl ligands, octahydrofluorenyl ligands, cyclooctatetraendiyl ligands, cyclopentacyclododecene ligands, azenyl ligands, azulene ligands, pentalene ligands, phosphoyl ligands, phosphinimine (WO 99/40125), pyrrolyl ligands, pyrozolyl ligands, carbazolyl ligands, borabenzene ligands and the like, including hydrogenated versions thereof, for example tetrahydroindenyl ligands. In one embodiment, $L^A$ and $L^B$ may be any other ligand structure capable of π-bonding to M. In yet another embodiment, the atomic molecular weight (MW) of $L^A$ or $L^B$ exceeds 60 a.m.u., or greater than 65 a.m.u. In another embodiment, $L^A$ and $L^B$ may comprise one or more heteroatoms, for example, nitrogen, silicon, boron, germanium, sulfur, and phosphorous, in combination with carbon atoms to form an open, acyclic, or a fused, ring or ring system, for example, a hetero-cyclopentadienyl ancillary ligand. Other $L^A$ and $L^B$ bulky ligands include but are not limited to bulky amides, phosphides, alkoxides, aryloxides, imides, carbolides, borollides, porphyrins, phthalocyanines, corrins, and other polyazomacrocycles. Independently, each $L^A$ and $L^B$ may be the same or different type of bulky ligand that is bonded to M. In one embodiment, of Formula III only one of either $L^A$ or $L^B$ is present.

Independently, each $L^A$ and $L^B$ may be unsubstituted or substituted with a combination of substituent groups R. Non-limiting examples of substituent groups R include one or more from the group selected from hydrogen, or linear, branched alkyl radicals, or alkenyl radicals, alkynyl radicals, cycloalkyl radicals or aryl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals, straight, branched or cyclic, alkylene radicals, or combination thereof. In an embodiment, substituent groups R have up to 50 non-hydrogen atoms, or from 1 to 30 carbons, that can also be substituted with halogens or heteroatoms, or the like. Non-limiting examples of alkyl substituents R include methyl, ethyl, propyl, butyl, pentyl, hexyl, cyclopentyl, cyclohexyl, benzyl or phenyl groups, and the like, including all their isomers, for example tertiary butyl, isopropyl, and the like. Other hydrocarbyl radicals include fluoromethyl, fluoroethyl, difluoroethyl, iodopropyl, bromohexyl, chlorobenzyl, and hydrocarbyl substituted organometalloid radicals including trimethylsilyl, trimethylgermyl, methyldiethylsilyl, and the like; halocarbyl-substituted organometalloid radicals including tris(trifluoromethyl)-silyl, methyl-bis(difluoromethyl)silyl, bromomethyldimethylgermyl, and the like; disubstituted boron radicals including dimethylboron, for example; and disubstituted pnictogen radicals including dimethylamine, dimethylphosphine, diphenylamine, methylphenylphosphine, chalcogen radicals including methoxy, ethoxy, propoxy, phenoxy, methylsulfide, and ethylsulfide. Non-hydrogen substituents R include the atoms carbon, silicon, boron, aluminum, nitrogen, phosphorous, oxygen, tin, sulfur, germanium, and the like, including olefins such as, but not limited to, olefinically unsaturated substituents including vinyl-terminated ligands, for example but-3-enyl, prop-2-enyl, hex-5-enyl, and the like. Also, at least two R groups, or two adjacent R groups, are joined to form a ring structure having from 3 to 30 atoms selected from carbon, nitrogen, oxygen, phosphorous, silicon, germanium, aluminum, boron, or a combination thereof.

Also, a substituent group R group such as 1-butanyl may form a carbon sigma bond to the metal M.

Other ligands may be bonded to the metal M, such as at least one leaving group Q. In one embodiment, Q is a monoanionic labile ligand having a sigma-bond to M. Depending on the oxidation state of the metal, the value for n is 0, 1, or 2 such that Formula V above represents a neutral bulky ligand metallocene catalyst compound.

Non-limiting examples of Q ligands include weak bases such as amines, phosphines, ethers, carboxylates, dienes, hydrocarbyl radicals having from 1 to 20 carbon atoms, hydrides or halogens and the like or a combination thereof. In another embodiment, two or more Q's form a part of a fused ring or ring system. Other examples of Q ligands include those substituents for R as described above and including cyclobutyl, cyclohexyl, heptyl, tolyl, trifluoromethyl, tetramethylene, pentamethylene, methylidene, methyoxy, ethyoxy, propoxy, phenoxy, bis(N-methylanilide), dimethylamide, dimethylphosphide radicals, and the like.

In another embodiment, the catalyst composition of the invention may include one or more bulky ligand metallocene catalyst compounds where $L^A$ and $L^B$ of Formula V are bridged to each other by at least one bridging group, A, as represented by:

$$L^A A L^B M Q_n \qquad (VI)$$

wherein $L^A$, $L^B$, M, Q, and n are as defined above. These compounds of Formula VI are known as bridged, bulky ligand metallocene catalyst compounds. Non-limiting examples of bridging group A include bridging groups containing at least one Group 13 to 16 atom, often referred to as a divalent moiety such as, but not limited to, at least one of a carbon, oxygen, nitrogen, silicon, aluminum, boron, germanium and tin atom, or a combination thereof. In an embodiment, bridging group A contains a carbon, silicon or germanium atom, or A contains at least one silicon atom or at least one carbon atom. The bridging group A may also contain substituent groups R as defined above including halogens and iron. Non-limiting examples of bridging group A may be represented by $R'_2C$, $R'_2Si$, $R'_2Si R'_2Si$, $R'_2Ge$, $R'P$, where R' is independently, a radical group which is hydride, hydrocarbyl, substituted hydrocarbyl, halocarbyl, substituted halocarbyl, hydrocarbyl-substituted organometalloid, halocarbyl-substituted organometalloid, disubstituted boron, disubstituted pnictogen, substituted chalcogen, or halogen or two or more R' may be joined to form a ring or ring system. In one embodiment, the bridged, bulky ligand metallocene catalyst compounds of Formula VI have two or more bridging groups A (EP 664 301 B1).

In another embodiment, the bulky ligand metallocene catalyst compounds are those where the R substituents on the bulky ligands $L^A$ and $L^B$ of Formulas V and VI are substituted with the same or different number of substituents on each of the bulky ligands. In another embodiment, the bulky ligands $L^A$ and $L^B$ of Formulas V and VI are different from each other.

Other bulky ligand metallocene catalyst compounds and catalyst systems useful in the invention may include those described in U.S. Pat. Nos. 5,064,802; 5,145,819; 5,149,819; 5,243,001; 5,239,022; 5,276,208; 5,296,434; 5,321,106; 5,329,031; 5,304,614; 5,677,401; 5,723,398; 5,753,578; 5,854,363; 5,856,547; 5,858,903; 5,859,158; 5,900,517; 5,939,503; PCT publications WO 93/08221; WO 93/08199; WO 95/07140; WO 98/11144; WO 98/41530; WO 98/41529; WO 98/46650; WO 99/02540; WO 99/14221; European publications EP-A-0 578 838; EP-A-0 638 595; EP-B-0 513 380; EP-A1-0 816 372; EP-A2-0 839 834; EP-B1-0 632 819; EP-B1-0 748 821; and EP-B1-0 757 996, all of which are herein fully incorporated by reference.

In another embodiment, the catalyst compositions of the invention may include bridged heteroatom, mono-bulky ligand metallocene compounds. These types of catalysts and catalyst systems are described in, for example, PCT publication WO 92/00333; WO 94/07928; WO 91/04257; WO 94/03506; WO 96/00244; WO 97/15602; WO 99/20637; U.S. Pat. Nos. 5,057,475; 5,096,867; 5,055,438; 5,198,401; 5,227,440; 5,264,405; and European publication EP-A-0 420 436, all of which are herein fully incorporated by reference.

In another embodiment, the catalyst composition of the invention includes one or more bulky ligand metallocene catalyst compounds represented by Formula VII:

$$L^C A J M Q_n \qquad (VII)$$

where M is a Group 3 to 16 metal atom or a metal selected from the Group of actinides and lanthanides of the Periodic Table of Elements, or M is a Group 4 to 12 transition metal, and or M is a Group 4, 5, or 6 transition metal, or M is a Group 4 transition metal in any oxidation state, especially titanium; $L^C$ is a substituted or unsubstituted bulky ligand bonded to M; J is bonded to M; A is bonded to J and $L^C$; J is a heteroatom ancillary ligand; A is a bridging group; Q is a univalent anionic ligand; and n is the integer 0, 1, or 2. In Formula VII above, $L^C$, A, and J form a fused ring system. In an embodiment, $L^C$ of Formula V is as defined above for $L^A$, A, M, and Q of Formula VII are as defined above in Formula V.

In Formula VII, J is a heteroatom containing ligand in which J is an element with a coordination number of three from Group 15 or an element with a coordination number of two from Group 16 of the Periodic Table of Elements. In an embodiment, J contains a nitrogen, phosphorus, oxygen, or sulfur atom with nitrogen being most preferred.

In an embodiment, when the catalyst system comprises compounds represented by Formula VII, the FC is a hydrofluorocarbon. In an embodiment, when the catalyst system comprises compounds represented by Formula VII, the FC is not a perfluorocarbon.

In an embodiment of the invention, the bulky ligand metallocene catalyst compounds are heterocyclic ligand complexes where the bulky ligands, the ring(s) or ring system(s), include one or more heteroatoms or a combination thereof. Non-limiting examples of heteroatoms include a Group 13 to 16 element, or nitrogen, boron, sulfur, oxygen, aluminum, silicon, phosphorous and tin. Examples of these bulky ligand metallocene catalyst compounds are described in WO 96/33202; WO 96/34021; WO 97/17379; WO 98/22486; EP-A1-0 874 005; U.S. Pat. Nos. 5,637,660; 5,539,124; 5,554,775; 5,756,611; 5,233,049; 5,744,417; and 5,856,258, all of which are herein incorporated by reference.

In one embodiment, the bulky ligand metallocene catalyst compounds are those complexes known as transition metal catalysts based on bidentate ligands containing pyridine or quinoline moieties, such as those described in U.S. application Ser. No. 09/103,620 filed Jun. 23, 1998, which is herein incorporated by reference. In another embodiment, the bulky ligand metallocene catalyst compounds are those described in PCT publications WO 99/01481 and WO 98/42664, which are fully incorporated herein by reference.

In another embodiment, the bulky ligand metallocene catalyst compound is a complex of a metal, or a transition metal, a bulky ligand, or a substituted or unsubstituted pi-bonded ligand, and one or more heteroallyl moieties, such as those described in U.S. Pat. Nos. 5,527,752; 5,747,406; and EP-B1-0 735 057, all of which are herein fully incorporated by reference.

In another embodiment, the catalyst composition of the invention includes one or more bulky ligand metallocene catalyst compounds as represented by Formula VIII:

$$L^D MQ_2(YZ)X_n \qquad (VIII)$$

where M is a Group 3 to 16 metal, or a Group 4 to 12 transition metal, or a Group 4, 5, or 6 transition metal; $L^D$ is a bulky ligand that is bonded to M; each Q is independently bonded to M and $Q_2(YZ)$ forms a ligand, or a unicharged polydentate ligand; or Q is a univalent anionic ligand also bonded to M; X is a univalent anionic group when n is 2 or X is a divalent anionic group when n is 1; n is 1 or 2.

In Formula VIII, L and M are as defined above for Formula V. Q is as defined above for Formula V, or Q is selected from the group consisting of —O—, —NR—, —CR2- and —S—; Y is either C or S; Z is selected from the group consisting of —OR, —NR2, —CR3, —SR, —SiR3, —PR2, —H, and substituted or unsubstituted aryl groups, with the proviso that when Q is —NR— then Z is selected from one of the group consisting of —OR, —NR2, —SR, —SiR3, —PR2, and —H; R is selected from a group containing carbon, silicon, nitrogen, oxygen, and/or phosphorus, or where R is a hydrocarbon group containing from 1 to 20 carbon atoms, or an alkyl, cycloalkyl, or an aryl group; n is an integer from 1 to 4, or 1 or 2; X is a univalent anionic group when n is 2 or X is a divalent anionic group when n is 1; or X is a carbamate, carboxylate, or other heteroallyl moiety described by the Q, Y, and Z combination.

Still other useful catalysts include those multinuclear metallocene catalysts as described in WO 99/20665 and U.S. Pat. No. 6,010,794, and transition metal metaaracyle structures described in EP 0 969 101 A2, which are herein incorporated herein by reference. Other metallocene catalysts include those described in EP 0 950 667 A1, double cross-linked metallocene catalysts (EP 0 970 074 A1), tethered metallocenes (EP 970 963 A2) and those sulfonyl catalysts described in U.S. Pat. No. 6,008,394, which are incorporated herein by reference.

It is also contemplated that, in one embodiment, the bulky ligand metallocene catalysts, described above, include their structural or optical or enantiomeric isomers (meso and racemic isomers, for example, see U.S. Pat. No. 5,852,143, incorporated herein by reference) and mixtures thereof.

In another embodiment, the bulky ligand type metallocene-type catalyst compound is a complex of a transition metal, a substituted or unsubstituted pi-bonded ligand, and one or more heteroallyl moieties, such as those described in U.S. Pat. Nos. 5,527,752; 5,747,406; and EP-B1-0 735 057, all of which are herein fully incorporated by reference.

The catalyst compositions of the invention may include one or more complexes known as transition metal catalysts based on bidentate ligands containing pyridine or quinoline moieties, such as those described in U.S. Pat. No. 6,103,657, which is herein incorporated by reference.

In one embodiment, these catalyst compounds are represented by the formula:

$$((Z)XA_t(YJ))_q MQ_n \qquad (IX)$$

where M is a metal selected from Group 3 to 13 or lanthanide and actinide series of the Periodic Table of Elements; Q is bonded to M and each Q is a monovalent, bivalent, or trivalent anion; X and Y are bonded to M; one or more of X and Y are heteroatoms, or both X and Y are heteroatoms; Y is contained in a heterocyclic ring J, where J comprises from 2 to 50 non-hydrogen atoms, or 2 to 30 carbon atoms; Z is bonded to X, where Z comprises 1 to 50 non-hydrogen atoms, or 1 to 50 carbon atoms, or Z is a cyclic group containing 3 to 50 atoms, or 3 to 30 carbon atoms; t is 0 or 1; when t is 1, A is a bridging group joined to at least one of X, Y, or J, or X and J; q is 1 or 2; n is an integer from 1 to 4 depending on the oxidation state of M. In one embodiment, where X is oxygen or sulfur, then Z is optional.

In another embodiment, where X is nitrogen or phosphorous, then Z is present. In an embodiment, Z is an aryl group, or a substituted aryl group.

In another embodiment of the invention, the bulky ligand metallocene-type catalyst compounds are those nitrogen containing heterocyclic ligand complexes, also known as transition metal catalysts based on bidentate ligands containing pyridine or quinoline moieties, such as those described in PCT publications WO 96/33202; WO 99/01481; WO 98/42664; and U.S. Pat. No. 5,637,660, which are herein all incorporated by reference.

It is within the scope of this invention, in one embodiment, the catalyst compounds include complexes of $Ni^{2+}$ and $Pd^{2+}$ described in the articles Johnson, et al., "New Pd(II)- and Ni(II)-Based Catalysts for Polymerization of Ethylene and a-Olefins," *J. Am. Chem. Soc.* 1995, 117, pp. 6414-6415; Johnson, et al., "Copolymerization of Ethylene and Propylene with Functionalized Vinyl Monomers by Palladium(II) Catalysts," *J. Am. Chem. Soc.*, 1996, 118, pp. 267-268; WO 96/23010 published Aug. 1, 1996; WO 99/02472; U.S. Pat. Nos. 5,852,145; 5,866,663; and 5,880,241, which are all herein fully incorporated by reference. These complexes can be either dialkyl ether adducts, or alkylated reaction products of the described dihalide complexes that can be activated to a cationic state by the activators of this invention described below.

Also included as bulky ligand metallocene-type catalyst compounds useful herein are those diimine based ligands for Group 8 to 10 metal compounds disclosed in PCT publications WO 96/23010 and WO 97/48735 and Gibson, et al., Chem. Comm., pp. 849-850 (1998), all of which are herein incorporated by reference.

Other bulky ligand metallocene-type catalysts useful herein are those Group 5 and 6 metal imido complexes described in EP-A2-0 816 384 and U.S. Pat. No. 5,851,945, which are incorporated herein by reference. In addition, bulky ligand metallocene-type catalysts useful herein include bridged bis(arylamido) Group 4 compounds described by D. H. McConville, et al., in Organometallics 1195, 14, pp. 5478-5480, which is herein incorporated by reference. Other bulky ligand metallocene-type catalysts useful herein are described as bis(hydroxy aromatic nitrogen ligands) in U.S. Pat. No. 5,852,146, which is incorporated herein by reference. Other metallocene-type catalysts containing one or more Group 15 atoms useful herein include those described in WO 98/46651, which is herein incorporated herein by reference. Still another metallocene-type bulky ligand metallocene-type catalysts useful herein include those multinuclear bulky ligand metallocene-type catalysts as described in WO 99/20665, which is incorporated herein by reference. In addition, useful Group 6 bulky ligand metallocene catalyst systems are described in U.S. Pat. No. 5,942,462, which is incorporated herein by reference.

It is contemplated in an embodiment that the bulky ligands of the metallocene-type catalyst compounds of the invention described above may be asymmetrically substituted in terms of additional substituents or types of substituents, and/or unbalanced in terms of the number of additional substituents on the bulky ligands or the bulky ligands themselves are different.

It is also contemplated that in one embodiment, the bulky ligand metallocene-type catalysts of the invention include their structural or optical or enantiomeric isomers (meso and racemic isomers) and mixtures thereof. In another embodiment, the bulky ligand metallocene-type compounds useful in the invention may be chiral and/or a bridged bulky ligand metallocene-type catalyst compound.

It is also within the scope of this invention that the above described bulky ligand metallocene-type catalyst compounds can be combined with one or more of the conventional-type transition metal catalysts compounds with one or more co-catalysts or activators or activation methods described above. For example, see U.S. Pat. Nos. 4,937,299; 4,935,474; 5,281,679; 5,359,015; 5,470,811; and 5,719,241, all of which are herein fully incorporated by reference.

In another embodiment of the invention, one or more bulky ligand metallocene-type catalyst compounds or catalyst systems may be used in combination with one or more conventional-type catalyst compounds or catalyst systems. Non-limiting examples of mixed catalysts and catalyst systems are described in U.S. Pat. Nos. 4,159,965; 4,325,837; 4,701,432; 5,124,418; 5,077,255; 5,183,867; 5,391,660; 5,395,810; 5,691,264; 5,723,399; 5,767,031; and PCT Publication WO 96/23010 published Aug. 1, 1996, all of which are herein fully incorporated by reference.

It is further contemplated that two or more conventional-type transition metal catalysts may be combined with one or more conventional-type cocatalysts. Non-limiting examples of mixed conventional-type transition metal catalysts are described in, for example, U.S. Pat. Nos. 4,154,701; 4,210,559; 4,263,422; 4,672,096; 4,918,038; 5,198,400; 5,237,025; 5,408,015; and 5,420,090, all of which are herein incorporated by reference.

In a preferred embodiment, one catalyst is used in any reaction described herein, e.g., two or more catalysts are not used in the same reactor. It is contemplated that the metallocene catalyst components described above include their structural or optical or enantiomeric isomers (racemic mixture), and may be a pure enantiomer in one embodiment. For example, a single, bridged, asymmetrically substituted metallocene catalyst component having a racemic and/or meso isomer does not, itself, constitute at least two different bridged, metallocene catalyst components. The two catalysts are considered different if they differ by at least one atom, for example bis(cyclopentadienyl) hafnium dichloride is different from (methylcyclopentadienyl)(cyclopentadienyl) hafnium dichloride.

In a preferred embodiment, the catalyst used herein does not comprise a mixture of two catalytically active isomers, and if two catalytically active isomers are present, at least one isomer is present at an amount that does not significantly alter the polymer MWD or CD.

In a preferred embodiment, the catalyst used herein comprises a mixture of two catalytically active isomers.

In a preferred embodiment, the catalyst used herein comprises a mixture of two different catalysts.

In a preferred embodiment, the catalysts used herein are capable of incorporating macromonomers e.g., $C_8$ to $C_{1500}$ alpha olefins, preferably producing and re-incorporating such macromonomers.

The above described polymerization catalyst, particularly bulky ligand metallocene-type catalyst compounds, are typically activated in various ways to yield catalyst compounds having a vacant coordination site that will coordinate, insert, and polymerize olefin(s).

For the purposes of this invention, the term "activator" is defined to be any compound which can activate any one of the catalyst compounds described herein by converting the neutral catalyst compound to a catalytically active catalyst cation compound. Non-limiting activators, for example, include alumoxanes, aluminum alkyls, ionizing activators, which may be neutral or ionic, and conventional-type cocatalysts.

In one embodiment, alumoxane activators are utilized as an activator in the catalyst composition of the invention. Alumoxanes are generally oligomeric compounds containing —Al(R)—O— subunits, where R is an alkyl group. Non-limiting examples of alumoxanes include methylalumoxane (MAO), modified methylalumoxane (MMAO), ethylalumoxane and isobutylalumoxane. Alumoxanes may be produced by the hydrolysis of the respective trialkylaluminum compound. MMAO may be produced by the hydrolysis of trimethylaluminum and a higher trialkylaluminum such as triisobutylaluminum. MMAO's are generally more soluble in aliphatic solvents and more stable during storage. There are a variety of methods for preparing alumoxane and modified alumoxanes, non-limiting examples of which are described in U.S. Pat. Nos. 4,665,208; 4,952,540; 5,091,352; 5,206,199; 5,204,419; 4,874,734; 4,924,018; 4,908,463; 4,968,827; 5,308,815; 5,329,032; 5,248,801; 5,235,081; 5,157,137; 5,103,031; 5,391,793; 5,391,529; 5,693,838; 5,731,253; 5,731,451; 5,744,656; 5,847,177; 5,854,166; 5,856,256; 5,939,346; European publications EP-A-0 561 476; EP-B1-0 279 586; EP-A-0 594-218; EP-B1-0 586 665; PCT publications WO 94/10180; and WO 99/15534, all of which are herein fully incorporated by reference. Another alumoxane is a modified methyl alumoxane (MMAO) cocatalyst type 3A (commercially available from Akzo Chemicals, Inc. under the trade name Modified Methylalumoxane type 3A, covered under patent number U.S. Pat. No. 5,041,584). Aluminum Alkyl or organoaluminum compounds which may be utilized as activators include trimethylaluminum, triethylaluminum, triisobutylaluminum, tri-n-hexylaluminum, tri-n-octylaluminum, and the like.

It is within the scope of this invention to use an ionizing or stoichiometric activator, neutral or ionic, such as tri (n-butyl) ammonium tetrakis (pentafluorophenyl) boron, a trisperfluorophenyl boron metalloid precursor or a trisperfluoronaphthyl boron metalloid precursor, polyhalogenated heteroborane anions (WO 98/43983), boric acid (U.S. Pat. No. 5,942, 459), or combination thereof. It is also within the scope of this invention to use neutral or ionic activators alone or in combination with alumoxane or modified alumoxane activators.

Non-limiting examples of neutral stoichiometric activators include tri-substituted boron, tellurium, aluminum, gallium and indium or mixtures thereof. The three substituent groups are each independently selected from alkyls, alkenyls, halogen, substituted alkyls, aryls, arylhalides, alkoxy, and halides. Or, the three groups are independently selected from halogen, mono or multicyclic (including halosubstituted) aryls, alkyls, alkenyl compounds, and mixtures thereof, preferred are alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls). Or, the three groups are alkyls having 1 to 4 carbon groups, phenyl, naphthyl or mixtures thereof. Even or, the three groups are halogenated, or fluorinated, aryl groups. Or, the neutral stoichiometric activator is trisperfluorophenyl boron or trisperfluoronaphthyl boron.

"Substituted alkyl" refers to an alkyl as described in which one or more hydrogen atoms of the alkyl is replaced by another group such as a halogen, aryl, substituted aryl, cycloalkyl, substituted cycloalkyl, and combinations thereof. Examples of substituted alkyls include, for example, benzyl, trifluoromethyl, and the like.

Ionic stoichiometric activator compounds may contain an active proton, or some other cation associated with, but not coordinated to, or only loosely coordinated to, the remaining ion of the ionizing compound. Such compounds and the like are described in European publications EP-A-0 570 982; EP-A-0 520 732; EP-A-0 495 375; EP-B1-0 500 944; EP-A-0 277 003; EP-A-0 277 004; U.S. Pat. Nos. 5,153,157; 5,198, 401; 5,066,741; 5,206,197; 5,241,025; 5,384,299; 5,502,124; and U.S. patent application Ser. No. 08/285,380, filed Aug. 3, 1994, all of which are herein fully incorporated by reference.

In an embodiment, the stoichiometric activators include a cation and an anion component, and may be represented by the following formula:

$(L-H)_d^+ \cdot (A^{d-})$ (X)

wherein: L is a neutral Lewis base; H is hydrogen; $(L-H)^+$ is a Bronsted acid; $A^{d-}$ is a non-coordinating anion having the charge d−; and d is an integer from 1 to 3. The cation component, $(L-H)_d^{30}$ may include Bronsted acids such as protons or protonated Lewis bases or reducible catalysts capable of protonating or abstracting a moiety, such as an alkyl or aryl, from the bulky ligand metallocene or Group 15 containing transition metal catalyst precursor, resulting in a cationic transition metal species.

The activating cation $(L-H)_d^+$ may be a Bronsted acid, capable of donating a proton to the transition metal catalytic precursor resulting in a transition metal cation, including ammoniums, oxoniums, phosphoniums, silyliums and mixtures thereof, or ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxomiuns from ethers such as dimethyl ether diethyl ether, tetrahydrofuran and dioxane, sulfoniums from thioethers, such as diethyl thioethers and tetrahydrothiophene, and mixtures thereof. The activating cation $(L-H)_d^+$ may also be an abstracting moiety such as silver, carboniums, tropylium, carbeniums, ferroceniums and mixtures, or carboniums and ferroceniums. In an embodiment, $(L-H)_d^+$ is triphenyl carbonium.

The anion component $A^{d-}$ includes those having the formula $[M^{k+}Q_n]^{d-}$ wherein k is an integer from 1 to 3; n is an integer from 2-6; n−k=d; M is an element selected from Group 13 of the Periodic Table of the Elements, or boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than 1 occurrence is Q a halide. In an embodiment, each Q is a fluorinated hydrocarbyl group having 1 to 20 carbon atoms, or each Q is a fluorinated aryl group, or each Q is a pentafluoryl aryl group. Examples of suitable $A^{d-}$ also include diboron compounds as disclosed in U.S. Pat. No. 5,447,895, which is fully incorporated herein by reference.

Or, the ionic stoichiometric activator $(L-H)_d^+ \cdot (A^{d-})$ is N,N-dimethylanilinium tetra(perfluorophenyl)borate or triphenylcarbenium tetra(perfluorophenyl)borate.

In a preferred embodiment, the activators are represented by the following formula:

$(Z)_d^+ A^{d-}$ wherein $(Z)_d^+$ is the cation component and $A^{d-}$ is the anion component; where Z is (L-H) or a reducible Lewis Acid, L is an neutral Lewis base; H is hydrogen; $(L-H)^+$ is a Bronsted acid; $A^{d-}$ is a non-coordinating anion having the charge d−; and d is an integer from 1 to 3. Preferably, when Z is a reducible Lewis acid, $(Z)_d^+$ is represented by the formula: $(Ar_3C)^+$, where Ar is aryl or aryl substituted with a heteroatom, a $C_1$ to $C_{40}$ hydrocarbyl, or a substituted $C_1$ to $C_{40}$ hydrocarbyl, preferably $(Z)_d^+$ is represented by the formula: $(Ph_3C)^+$, where Ph is phenyl or phenyl substituted with a heteroatom, a $C_1$ to $C_{40}$ hydrocarbyl, or a substituted $C_1$ to $C_{40}$ hydrocarbyl. In a preferred embodiment, the reducible Lewis acid is triphenyl carbenium.

In another embodiment, the activator comprises a "Bulky activator" which is defined to be ionic stoichiometric activators represented by the formula:

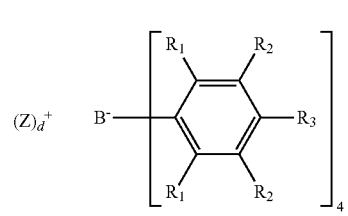

where:
each $R_1$ is, independently, a halide, preferably a fluoride;
each $R_2$ is, independently, a halide, a $C_6$ to $C_{20}$ substituted aromatic hydrocarbyl group or a siloxy group of the formula —O—Si—$R_a$, where $R_a$ is a $C_1$ to $C_{20}$ substituted or unsubstituted hydrocarbyl or hydrocarbylsilyl group (preferably $R_2$ is a fluoride or a perfluorinated phenyl group);
each $R_3$ is a halide, $C_6$ to $C_{20}$ substituted aromatic hydrocarbyl group or a siloxy group of the formula —O—Si—$R_a$, where $R_a$ is a $C_1$ to $C_{20}$ substituted or unsubstituted hydrocarbyl or hydrocarbylsilyl group (preferably $R_3$ is a fluoride or a $C_6$ perfluorinated aromatic hydrocarbyl group); wherein $R_2$ and $R_3$ can form one or more saturated or unsaturated, substituted or unsubstituted rings (preferably $R_2$ and $R_3$ form a perfluorinated phenyl ring); $(Z)_d{}^+$ is the cation component; where Z is (L-H) or a reducible Lewis Acid, L is a neutral Lewis base; H is hydrogen; $(L-H)^+$ is a Bronsted acid; and d is an integer from 1 to 3; wherein the boron anion component has a molecular weight of greater than 1020 g/mol; and wherein at least three of the substituents on the B atom each have a molecular volume of greater than 250 cubic Å, alternately greater than 300 cubic Å, or alternately greater than 500 cubic Å.

"Molecular volume" is used herein as an approximation of spatial steric bulk of an activator molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume.

Molecular volume may be calculated as reported in "A Simple 'Back of the Envelope' Method for Estimating the Densities and Molecular Volumes of Liquids and Solids," Journal of Chemical Education, Vol. 71, No. 11, November 1994, pp. 962-964. Molecular volume (MV), in units of cubic Å, is calculated using the formula: $MV=8.3V_s$, where $V_s$ is the scaled volume. $V_s$ is the sum of the relative volumes of the constituent atoms, and is calculated from the molecular formula of the substituent using the following table of relative volumes. For fused rings, the $V_s$ is decreased by 7.5% per fused ring.

| Element | Relative Volume |
|---|---|
| H | 1 |
| 1$^{st}$ short period, Li to F | 2 |
| 2$^{nd}$ short period, Na to Cl | 4 |
| 1$^{st}$ long period, K to Br | 5 |
| 2$^{nd}$ long period, Rb to I | 7.5 |
| 3$^{rd}$ long period, Cs to Bi | 9 |

In one embodiment, an activation method using ionizing ionic compounds not containing an active proton but capable of producing a bulky ligand metallocene catalyst cation and their non-coordinating anion are also contemplated, and are described in EP-A-0 426 637; EP-A-0 573 403; and U.S. Pat. No. 5,387,568, which are all herein incorporated by reference.

Other activators include those described in PCT publication WO 98/07515 such as tris (2,2',2"-nonafluorobiphenyl) fluoroaluminate, which publication is fully incorporated herein by reference. Combinations of activators are also contemplated by the invention, for example, alumoxanes and ionizing activators in combinations, see for example, EP-B1 0 573 120; PCT publications WO 94/07928; WO 95/14044; U.S. Pat. No. 5,153,157; and U.S. Pat. No. 5,453,410, all of which are herein fully incorporated by reference.

Other suitable activators are disclosed in WO 98/09996, incorporated herein by reference, which describes activating bulky ligand metallocene catalyst compounds with perchlorates, periodates, and iodates including their hydrates. WO 98/30602 and WO 98/30603, incorporated by reference, describe the use of lithium (2,2'-bisphenyl-ditrimethylsilicate).b 4 THF as an activator for a bulky ligand metallocene catalyst compound. WO 99/18135, incorporated herein by reference, describes the use of organo-boron-aluminum activators. EP-B1-0 781 299, herein incorporated by reference, describes using a silylium salt in combination with a non-coordinating compatible anion. Also, methods of activation such as using radiation (see EP-B1-0 615 981 herein incorporated by reference), electro-chemical oxidation, and the like are also contemplated as activating methods for the purposes of rendering the neutral bulky ligand metallocene catalyst compound or precursor to a bulky ligand metallocene cation capable of polymerizing olefins.

Other activators or methods for activating a bulky ligand metallocene catalyst compound are described in, for example, U.S. Pat. Nos. 5,849,852; 5,859,653; 5,869,723; PCT publications WO 98/32775; and WO 99/42467 (dioctadecylmethylammonium-bis(tris(pentafluorophenyl)borane) benzimidazolide), which are herein incorporated by reference.

Another suitable ion forming, activating cocatalyst comprises a salt of a cationic oxidizing agent and a noncoordinating, compatible anion represented by the formula:

$$(OX^{e+})_d(A^{d-})_e \qquad (XII)$$

wherein: $OX^{e+}$ is a cationic oxidizing agent having a charge of e+; e is an integer from 1 to 3; and $A^-$, and d is as previously defined above. Non-limiting examples of cationic oxidizing agents include: ferrocenium, hydrocarbyl-substituted ferrocenium, $Ag^+$, or $Pb^{+2}$. In an embodiment, $A^{d-}$ are those anions previously defined with respect to the Bronsted acid containing activators, especially tetrakis(pentafluorophenyl)borate.

It is within the scope of this invention that catalyst compounds can be combined with one or more activators or activation methods described above. For example, a combination of activators have been described in U.S. Pat. Nos. 5,153,157; 5,453,410; European publication EP-B1 0 573 120; PCT publications WO 94/07928; and WO 95/14044. These documents all discuss the use of an alumoxane and an ionizing activator with a bulky ligand metallocene catalyst compound.

The catalyst systems used to produce the present copolymer may also include a support material or carrier. For example, the one or more catalyst components and/or one or more activators may be deposited on, contacted with, vaporized with, bonded to, or incorporated within, adsorbed or absorbed in, or on, one or more supports or carriers. The support material may be any of the conventional support materials. In an embodiment, the support material is a porous support material, for example, talc, inorganic oxides and inorganic chlorides. Other support materials include resinous support materials such as polystyrene, functionalized or crosslinked organic supports, such as polystyrene divinyl benzene polyolefins or polymeric compounds, zeolites, clays, or any other organic or inorganic support material and the like, or mixtures thereof.

Typical support materials are inorganic oxides that include Group 2, 3, 4, 5, 13, or 14 metal oxides, such as silica, which may or may not be dehydrated, fumed silica, alumina (WO 99/60033), silica-alumina, and mixtures thereof. Other useful supports include magnesia, titania, zirconia, magnesium chloride (U.S. Pat. No. 5,965,477), montmorillonite (European Patent EP-B1 0 511 665), phyllosilicate, zeolites, talc, clays (U.S. Pat. No. 6,034,187), and the like. Also, combinations of these support materials may be used, for example, silica-chromium, silica-alumina, silica-titania, and the like. Additional support materials may include those porous acrylic polymers described in EP 0 767 184 B1, which is incorporated herein by reference. Other support materials include nanocomposites as described in PCT WO 99/47598, aerogels as described in WO 99/48605, spherulites as described in U.S. Pat. No. 5,972,510 and polymeric beads as described in WO 99/50311, which are all herein incorporated by reference.

When present, the support material typically has a surface area in the range of from about 10 to about 700 m$^2$/g, pore volume in the range of from about 0.1 to about 4.0 cc/g and average particle size in the range of from about 5 to about 500 μm. Or, the surface area of the support material is in the range of from about 50 to about 500 m$^2$/g, pore volume of from about 0.5 to about 3.5 cc/g and average particle size of from about 10 to about 200 μm. Or the surface area of the support material is in the range of from about 100 to about 400 m$^2$/g, pore volume from about 0.8 to about 3.0 cc/g and average particle size is from about 5 to about 100 μm. The average pore size of the support material is typically in the range of from 10 to 1000 Å, or 50 to about 500 Å, or 75 to about 350 Å.

In an embodiment, a polyolefin comprising a multi-modal compositional distribution with respect to the incorporation of a second olefin within a first olefin, a percent crystallinity in the polymer species present, or a combination thereof, wherein the polymer is produced by a process comprising providing a bulk liquid phase comprising a first olefin and a polymerization catalyst system in a bubble column reactor system; directing a gaseous stream comprising a second olefin at least partially through the bulk liquid phase at a gas velocity sufficient to produce a stream of bubbles thereby contacting the first olefin and the second olefin with the catalyst system at a temperature and a pressure sufficient to produce the polyolefin.

In an embodiment, the first melting temperature of the polymer is at least 30° C. higher, or 40° C. higher, or 50° C. higher, or 60° C. higher, or 70° C. higher, or 80° C. higher, or 90° C. higher, or 100° C. higher than a second melting temperature as determined according to DSC. Conveniently, the reactor polymer blend typically has a melting temperature of 60° C. or more, and generally 70° C. or more, such as 80° C. or more, for example 90° C. or more. The term "melting point," as used herein, for the reactor polymer blend, is the highest temperature peak among principal and secondary melting peaks as determined by DSC. In an embodiment, the reactor polymer blend may have a melting point by DSC ranging from an upper limit of 130° C., 120° C., 110° C., 100° C., or 90° C., to a lower limit of 5° C., 10° C., 20° C., 30° C., 40° C., or 50° C.

In an embodiment, the reactor blend has a crystallization temperature of 130° C. or less. The term "peak crystallization temperature" or "crystallization temperature" as used herein, for the reactor polymer blend, is the highest temperature peak among principal and secondary crystallization peaks as determined by DSC. In an embodiment, the crystallinity of the first and the second polymer components in the reactor blend is far apart, the polymer blend will show two individual peaks for each component. The reactor polymer blend has a crystallization temperature by DSC ranging from an upper limit of 120° C., 100° C., 90° C., 70° C., or 40° C., to a lower limit of 0° C., 10° C., 30° C., 40° C., or 70° C.

The melting temperatures of the reactor polymer blend produced directly reflect the degree of crystallinity of the crystalline polymer component in the blend. The polymer blend can have a high melting temperature in a wide range of densities. In one embodiment, the polymer produced has a melting temperature of 100° C. or higher and a density of 0.920 g/cm$^3$ or less, or 110° C. or higher and a density of 0.930 g/cm$^3$ or less, or 115° C. or higher and a density of 0.880 g/cm$^3$ or less. Lower value of density means softer materials. Alternatively, the inventive polymer blends have shore hardness from 30 A to 40 D as determined according to ISO 868 and a melting temperature of 110° C. or higher.

In an embodiment, the in-reactor polymer blends have high melting temperature over a wide range of density from 0.84 to 0.95 g/cm$^3$. The melting temperature of traditional random copolymers of ethylene/alpha-olefins or propylene/alpha-olefin decreases with decreasing densities. In contrast, the in-reactor polymer blends exhibit melting points substantially independent of the density, particularly when density is between about 0.84 to about 0.95 g/cm$^3$. For example, the melting points of ethylene copolymer blends are in the range of about 100° C. to about 130° C. when density ranges from 0.84 to about 0.92 g/cm$^3$. In an embodiment, the melting points of polymer blends are in the range of about 100° C. to about 125° C. when density ranges from 0.84 to about 0.92 g/cm$^3$.

Depending on the crystallinity level of the semi-crystalline component and the composition difference between the components, the two components may be immiscible and form a phase separated mixture following recovery of the product from the reactor. The presence of multiple phases can readily be measured by standard polymer characterization techniques such as light microscopy, electron microscopy, or atomic force microscopy (AFM). Two phase polymer blends often have advantageous properties, and it is a particular objective of this invention to produce such two phase blends by direct polymerization.

Alternatively, the in-reactor blends are miscible. The in-reactor produced polymer blend then has homogeneous morphology. When all the individual components are capable of crystallizing to a limited extent, they are at least partially co-crystallized.

In contrast, a "homogeneous blend" is a composition having substantially one morphological phase in the same state. For example, a blend of two polymers, where one polymer is miscible with another polymer, is said to be homogeneous in the solid state. Such morphology is determined using AFM. By miscible it is meant that the blend of two or more polymers exhibits single-phase behavior for the glass transition temperature, e.g., the Tg would exist as a single, sharp transition temperature on a dynamic mechanical thermal analyzer (DMTA) trace of tan δ (i.e., the ratio of the loss modulus to the storage modulus) versus temperature. By contrast, two separate transition temperatures would be observed for an immiscible blend, typically corresponding to the temperatures for each of the individual components of the blend. Thus, a polymer blend is miscible when there is one Tg indicated on the DMTA trace. A miscible blend is homogeneous, while an immiscible blend is heterogeneous.

Generally, the reactor blend has a crystallinity of 80% or less, typically 70% or less, as calculated using heat of fusion obtained from DSC analysis. A sum of the heat of fusion from all melting peaks is used when multiple melting peaks are present. The heat of fusion for 100% crystallinity is selected from the homopolymer of the primary composition in the reactor polymer blend. For example, when the polymer blend is made of an ethylene homopolymer and ethylene/hexene copolymer, ethylene is the primary composition, and the heat of fusion of 100% crystalline polyethylene is used (e.g., 290 J/g). In one embodiment, the reactor produced polymer blend has a heat of fusion between about 10 and about 270 J/g, for example between about 30 and about 200 J/g, such as between about 40 and about 200 J/g.

In an embodiment, the reactor blend has a weight average molecular weight of between 10,000 and 2,000,000 g/mol, such as between 20,000 and 1,500,000 g/mol with a polydispersity index (PDI=$M_w/M_n$) in the range of 1.5 to 40. The polydispersity index is partially dependent on the catalysts and process condition employed in the polymerization process. For example, polymerization involving multiple catalysts may produce a copolymer with broader or multimodal molecular weight distribution. Multiple reactors with different polymerization conditions may produce polymer blend with multimodal molecular weight distributions. In one embodiment, the polymer blend produced may have a bimodal, or multimodal molecular weight distribution. By bimodal or multimodal is meant that a polymer may have two or more modes, which may be manifest by a differential scanning calorimetry (DSC) trace having more than one peak or inflection points, a size exclusion chromatogram (SEC) having more than one peak or inflection points, and/or the like. An inflection point is that point where the second derivative of the curve changes in sign (e.g., from negative to positive or vice versa).

In another embodiment, the difference in propylene content between the two components is such that one is semi-crystalline and the other is amorphous. Semi-crystalline is defined as having a melting point as measured by DSC and a crystallinity of least 5% while amorphous is defined as either the absence of a DSC melting point or a crystallinity of less than 5%. The semicrystalline polymers of this invention generally have melting points of about 40° C. to 140° C., depending on the polymer composition. DSC measurements are made by the procedure described in the Examples section. Propylene copolymers are generally amorphous at ethylene contents between 20 wt % and 70 wt % with the catalysts of this invention. If a polymer component with ethylene crystallinity is desired in the blend, this should have in excess of 60 wt % ethylene. On the other hand, if a component is desired with propylene crystallinity, it should have less than about 20 wt % ethylene. Furthermore, in this case, it may be necessary to use a catalyst system that is capable of polymerizing propylene stereospecifically. Catalyst systems that produce isotactic propylene sequences are suitable for use herein. In a preferred embodiment, the catalyst system comprises a bridged bisindenyl hafnium (or zirconium) dialkyl or dihalogen compound having hydrocarbyl ($C_1$ to $C_{20}$) substitutions at the 2 and 4 positions, such as dimethylsilyl bis(2-methyl, 4-phenyl indenyl) hafnium dimethyl or dimethylsilyl bis(2-methyl, 4-phenyl indenyl) hafnium dichloride.

The present invention provides the following embodiments:

1. A process comprising contacting a catalyst system with one or more olefins in a bubble column reactor at bimodal polymerization conditions to form a polyolefin having a bimodal distribution with respect to composition distribution, molecular weight distribution or a combination thereof.
2. The process of embodiment 1, wherein the polyolefin comprises an Mw of 10,000 g/mol or more.
3. The process of either of embodiment 1 or 2, wherein the polyolefin comprises at least two melting peaks in a DSC heating cycle with a difference in melting temperatures of at least 5° C.
4. The process of any one of embodiments 1 to 3, wherein the one or more olefins comprise ethylene, propylene, $C_4$ to $C_{20}$ alpha olefin, or a combination thereof.
5. The process of any one of embodiments 1 to 4, wherein the catalyst system comprises a metallocene catalyst.
6. The process of any one of embodiments 1 to 5, wherein the catalyst system comprises a homogenous catalyst and the bubble column reactor comprises a polymer solution reactor.
7. The process of any one of embodiments 1 to 5, wherein the catalyst system comprises a supported catalyst and the bubble column reactor comprises a polymer slurry reactor.
8. The process of any one of embodiments 1 to 7 comprising sparging a gaseous olefin feedstream into a bulk phase in the bubble column reactor.
9. The process of any one of embodiments 1 to 8 comprising introducing first and second olefin feedstreams into a bulk phase in the bubble column reactor, wherein the first olefin feedstream is liquid and the second olefin feedstream is gaseous.
10. The process of embodiment 9, wherein the first olefin feedstream comprises propylene and the second olefin feedstream comprises ethylene.
11. The process of either one of embodiments 9 or 10, wherein the second olefin feedstream further comprises propylene.
12. The process of any one of embodiments 9 to 11, wherein the second olefin feedstream further comprises a gaseous diluent, hydrogen, or a combination thereof.
13. The process of any one of embodiments 9 to 12 further comprising recycling overhead vapor from the bubble column reactor to the second olefin feedstream.
14. The process of any one of embodiments 1 to 13 further comprising recovering a polyolefin product stream from the bulk liquid phase, recovering polyolefin from the polyolefin product stream to form a polyolefin-lean stream, and recycling at least a portion of the polyolefin-lean stream to the bubble column reactor.
15. The process of any one of embodiments 1 to 14 further comprising maintaining a heterogeneous regime (churn-turbulent regime) in the bulk phase.
16. The process of any one of embodiments 1 to 15 further comprising supplying a liquid diluent to a bulk phase in the bubble column reactor.
17. The polyolefin obtained from the process of any one of embodiments 1 to 16.
18. A polyolefin copolymer composition comprising ethylene, propylene, and, optionally, a $C_4$ to $C_{20}$ alpha olefin; a bimodal distribution with respect to composition distribution, molecular weight distribution or a combination thereof; an Mw of 10,000 g/mol or more; and at least two melting peaks in a DSC heating cycle with a difference in melting temperatures of at least 5° C.
19. The polyolefin copolymer of embodiment 18, wherein the copolymer is obtained as a product stream from a bubble column reactor.
20. The polyolefin copolymer of either of embodiments 18 or 19, wherein the difference in melting temperature is at least 30° C.

EXPERIMENTAL SECTION

The invention will now be more particularly described with reference to the accompanying non-limiting Examples.

Peak melting point, Tm, (also referred to as melting point), peak crystallization temperature, Tc, (also referred to as crystallization temperature), glass transition temperature (Tg), heat of fusion (ΔHf or Hf), and percent crystallinity were determined using the following DSC procedure according to ASTM D3418-03. Differential scanning calorimetric (DSC) data were obtained using a TA Instruments model Q100 machine. Samples weighing approximately 5 to 10 mg were sealed in an aluminum hermetic sample pan. The DSC data were recorded by first gradually heating the sample to 200° C. at a rate of 10° C./minute. The sample was kept at 200° C. for 2 minutes, then cooled to −90° C. at a rate of 10° C./minute, followed by an isothermal for 2 minutes and heating to 200° C. at 10° C./minute. Both the first and second cycle thermal events were recorded. Areas under the endothermic peaks were measured and used to determine the heat of fusion and the percent of crystallinity. The percent crystallinity is calculated using the formula, [area under the melting peak (Joules/gram)/B(Joules/gram)]*100, where B is the heat of fusion for the 100% crystalline homopolymer of the major monomer component. These values for B are to be obtained from the Polymer Handbook, Fourth Edition, published by John Wiley and Sons, New York 1999, provided; however, that a value of 189 J/g (B) is used as the heat of fusion for 100% crystalline polypropylene, a value of 290 J/g is used for the heat of fusion for 100% crystalline polyethylene. The melting and crystallization temperatures reported here were obtained during the second heating/cooling cycle unless otherwise noted.

For polymers displaying multiple endothermic and exothermic peaks, all the peak crystallization temperatures and peak melting temperatures were reported. The heat of fusion for each endothermic peak was calculated individually. The percent crystallinity is calculated using the sum of heat of fusions from all endothermic peaks. Some of the polymer blends produced show a secondary melting/cooling peak overlapping with the principal peak, which peaks are considered together as a single melting/cooling peak. The highest of these peaks is considered the peak melting temperature/crystallization point. For the amorphous polymers, having comparatively low levels of crystallinity, the melting temperature is typically measured and reported during the first heating cycle. Prior to the DSC measurement, the sample was aged (typically by holding it at ambient temperature for a period of 2 days) or annealed to maximize the level of crystallinity.

Morphology data were obtained using an Atomic Force Microscope (AFM) in tapping phase. All specimens were analyzed within 8 hours after cryofacing to prevent specimen relaxation. During cryofacing, the specimens were cooled to −130° C. and cut with diamond knives in a Reichert cryogenic microtome. They were then stored in a dissector under flowing dry nitrogen gas to warm up to ambient temperatures without condensation being formed. Finally, the faced specimens were mounted in a miniature steel vise for AFM analysis. The AFM measurements were performed in air on a NanoScope Dimension 3000 scanning probe microscope (Digital Instrument) using a rectangular 225-mm Si cantilever. The stiffness of the cantilever was ~4 N/m with a resonance frequency of ~70 kHz. The free vibration amplitude was high, in the range of 80 nm to 100 nm, with a RMS setting of 3.8 volts. While the set point ratio was maintained at a value equal to or lower than 0.5, the contact set point was adjusted routinely to ensure repulsive contacts with positive phase shifts. The cantilever was running at or slightly below its resonance frequency.

The morphologies of the various samples were also examined using a scanning electron microscope (SEM, JSM-840). For the blends, the samples were first microtomed in liquid nitrogen, then the surfaces were etched in heptane at room temperature for different time ranging from 30 s to 48 h depending on the blend composition to remove the elastomer phase for SEM observation. For the foams, the inspected surfaces were freeze-fractured in liquid nitrogen, and then directly observed by SEM.

Transmission Electron Microscopy (TEM) was used to study details of the interface between the ethylene/propylene copolymer and the semi-crystalline polypropylene phases. TEM samples were prepared by staining the samples with $RuO_4$ and then cutting ~80 nm thick section in an ultracryomicrotome. The instrument used was FEI Tecnai G2 F20ST FEG-TEM operated at 200 kV. Images were recorded in Scanning TEM (STEM) mode using the High-Angle Annular Dark Field (HAADF) detector. Lower density and amorphous polymers take up more stain than do higher density and more crystalline components. The STEM-HAADF images are presented in inverted contrast so that areas with lower density appear bright and areas with higher density appear dark.

The ethylene content of ethylene/propylene copolymers was determined using FTIR according to the following technique. A thin homogeneous film of polymer, pressed at a temperature of about 150° C., was mounted on a Perkin Elmer Spectrum 2000 infrared spectrophotometer. A full spectrum of the sample from 600 cm-1 to 4000 cm-1 was recorded and the area under propylene band at ~1165 cm-1 and the area of ethylene band at ~732 cm-1 in the spectrum were calculated. The baseline integration range for the methylene rocking band is nominally from 695 cm-1 to the minimum between 745 and 775 cm-1. For the polypropylene band the baseline and integration range is nominally from 1195 to 1126 cm-1. The ethylene content in wt % was calculated according to the following equation:

$$\text{ethylene content (wt \%)} = 72.698 - 86.495X + 13.696X^2$$

where $X=AR/(AR+1)$ and AR is the ratio of the area for the peak at ~1165 cm-1 to the area of the peak at ~732 cm-1.

Molecular weights (number average molecular weight (Mn), weight average molecular weight (Mw), and z-average molecular weight (Mz)) were determined using a Polymer Laboratories Model 220 high temperature SEC with on-line differential refractive index (DRI), light scattering, and viscometer detectors. It used three Polymer Laboratories PLgel 10 m Mixed-B columns for separation using a flow rate of 0.54 ml/min and a nominal injection volume of 300 μL. The detectors and columns are contained in an oven maintained at 135° C. The light scattering detector is a high temperature miniDAWN (Wyatt Technology, Inc.). The primary components are an optical flow cell, a 30 mW, 690 nm laser diode light source, and an array of three photodiodes placed at collection angles of 45°, 90°, and 135°. The stream emerging from the SEC columns is directed into the miniDAWN optical flow cell and then into the DRI detector. The DRI detector is an integral part of the Polymer Laboratories SEC. The viscometer is a high temperature viscometer purchased from Viscotek Corporation and comprising four capillaries arranged in a Wheatstone bridge configuration with two pressure transducers. One transducer measures the total pressure drop across the detector, and the other, positioned between the two sides of the bridge, measures a differential pressure. The viscometer is inside the SEC oven, positioned after the DRI detector. The details of these detectors as well as their calibrations have been described by, for example, T. Sun, P. Brant, R. R. Chance, and W. W. Graessley, in Macromolecules, Volume 34, Number 19, pp. 6812-6820, (2001), incorporated herein by reference.

Solvent for the SEC experiment was prepared by adding 6 grams of butylated hydroxy toluene (BHT) as an antioxidant to a 4 liter bottle of 1,2,4 trichlorobenzene (TCB) (Aldrich Reagent grade) and waiting for the BHT to solubilize. The TCB mixture was then filtered through a 0.7 micron glass pre-filter and subsequently through a 0.1 micron Teflon filter. There was an additional online 0.7 micron glass pre-filter/0.22 micron Teflon filter assembly between the high pressure pump and SEC columns. The TCB was then degassed with an online degasser (Phenomenex, Model DG-4000) before entering the SEC. Polymer solutions were prepared by placing dry polymer in a glass container, adding the desired amount of TCB, then heating the mixture at 160° C. with continuous agitation for about 2 hours. All quantities were measured gravimetrically. The TCB densities used to express the polymer concentration in mass/volume units were 1.463 g/ml at room temperature and 1.324 g/ml at 135° C. The injection concentration ranged from 1.0 to 2.0 mg/ml, with lower concentrations being used for higher molecular weight samples. The averaged molecular weight reported in the following the examples were obtained from light scattering detector unless otherwise noted.

Temperature rising elution fractionation (TREF) analysis is conducted using Polymer Char TREF 200 (PolymerChar, Valencia, Spain) equipped with an infrared detector according to the method described by L. Wilde, T. R. Ryle, D. C. Knobeloch, I. R. Peat, Determination of Branching Distributions in Polyethylene and Ethylene Copolymers, J. Polymer Science, 1982, 20, pp. 441-455. The polymer sample is first dissolved in 1,2 dichlorobenzene with 400 ppm of butylated hydroxy toluene (BHT) at 160° C. for about 60 minutes at a polymer concentration of 2 to 6 mg/mL. The resulting solution is then introduced into a packed column and stabilized at 140° C. for about 45 minutes. The polymer sample is then allowed to crystallize in the packed column by slowly reducing the temperature to 30° C. or 0° C. at a cooling rate of 1° C./min. The sample is then first eluted from the column by pumping the solvent through the column at a flow rate of 1.0 ml/min for 10 minutes at 0° C. or 30° C. A TREF chromatogram curve is then generated by eluting the crystallized polymer sample from the column by slowly increasing the temperature of the eluting solvent from 0° C. or 30° C. to 140° C. at a rate of 2° C./min and eluting solvent flow rate of 1.0 ml/min. The concentration of eluted polymer is measured using the infrared detector.

Crystallization analysis fractionation (CRYSTAF) was conducted using a CRYSTAF 200 unit commercially available from PolymerChar, Valencia, Spain. The sample is dissolved in 1,2 dichlorobenzene at 160° C. at a polymer concentration of about 0.2 to 1.0 mg/ml for about 1 hour and stabilized at 95° C. for about 45 minutes. The sampling temperatures range from 95° C. to 30° C. or 95° C. to 0° C. at a cooling rate of 0.2° C./min. An infrared detector is used to measure the polymer solution concentrations. The cumulative soluble concentration is measured as the polymer crystallizes while the temperature is decreased. The analytical derivative of the cumulative profile reflects the crystallinity distribution of each of the polymer components of the reactor polymer blends. The CRYSTAF peak temperature and area are identified by the peak analysis module included in the CRYSTAF Software. The CRYSTAF peak finding routine identifies a peak temperature as a maximum in the dw/dT curve and the area between the largest positive inflections on either side of the identified peak in the derivative curve.

Brookfield viscosity was measured according the ASTM D3236 using a Brookfield digital viscometer at 190° C.

Melt flow rate (MFR) was determined according to ASTM D1238 using a load of 2.16 kg and at a temperature of 230° C.

Dynamic Mechanical Thermal Analysis (DMTA) examines the behavior of viscoelastic materials according to temperature and frequency dependent behavior. The application of a small stress produces a deformation (strain) in the material. The amount of deformation resulting from the applied stress yields information concerning the moduli of the material; its stiffness and damping properties. The DMTA is a controlled stress instrument applied in a sinusoidal fashion and gives a sinusoidal response versus time. As a consequence of the applied sinusoidal stress the material responds in an elastic (stores energy) and viscous (dissipatesenergy) manner. DMTA separates these responses into two different moduli values: Elastic Modulus (E') and the loss modulus (E") and in a temperature sweep these moduli are measured from the glassy region, the plateau region to the terminal region. The response of viscoelastic materials is out of phase with the input signal by an angle delta ($\delta$). The tangent of this angle is equal to the ratio E"/E' and it is a valuable indicator of the relative damping ability of the material. Any peak in the tan $\delta$ corresponds to a region where the material properties are changing very rapidly; the material is undergoing a transition or relaxation such as Tg (glass transition temperature) and other relaxations. For purpose of this invention and the claims thereto, Tg is determined by DSC, unless DSC cannot determine a Tg, then DMTA shall be used.

Examples 1 to 3

These examples demonstrate the polymerization of in-reactor blends in a continuous stirred-tank solution process to produce ethylene/propylene copolymers. All polymerizations were performed in a liquid filled, single-stage continuous reactor system. The reactor was a 0.5-liter stainless steel autoclave reactor and was equipped with a stirrer, a water cooling/steam heating element with a temperature controller, and a pressure controller. Solvents, ethylene, propylene and comonomers were first purified by passing through a three-column purification system. The purified solvents and monomers were then chilled to about −15° C. by passing through a chiller before being fed into the reactor through a manifold. Solvent and monomers were mixed in the manifold and fed into the reactor through a single tube. All liquid flow rates were measured using Brooksfield mass flow meters or Micro-Motion Coriolis-type flow meters. At the temperature and pressure conditions described below, the ethylene present in the reactor is in gaseous "bubble" form.

As an impurity scavenger, 250 ml of tri-n-octyl aluminum (TNOA) (25 wt % in hexane, Sigma Aldrich) was diluted in 22.83 kilogram of isohexane. The TNOA solution was stored in a 37.9-liter cylinder under nitrogen blanket. The solution was used for all polymerization runs until about 90% of consumption, and then a new batch was prepared. The feed rates of the TNOA solution were adjusted in a range from 0 (no scavenger) to 4 ml per minute to achieve a maximum catalyst activity.

The reactor was first prepared by continuously $N_2$ purging at a maximum allowed temperature, then pumping isohexane and scavenger solution through the reactor system for at least one hour. Monomers and catalyst solutions were then fed into the reactor for polymerization. Once the activity was established and the system reached equilibrium, the reactor was lined out by continuing operation of the system under the established condition for a time period of at least five times of mean residence time prior to sample collection. The resulting mixture, containing mostly solvent, polymer and unreacted monomers, was collected in a collection box. The collected samples were first air-dried in a hood to evaporate most of the solvent, and then dried in a vacuum oven at a temperature of about 90° C. for about 12 hours. The vacuum oven dried samples were weighed to obtain yields.

Catalyst used was [di(p-triethylsilylphenyl) methylene] (cyclopentadienyl) (3,8-di-t-butylfluorenyl)hafnium dimethyl catalyst (obtained from Albemarle). The catalyst was preactivated with N,N-dimethylanilinium tetrakis(pentafluorophenyl) borate at a molar ratio of about 1:1 in 900 ml of toluene. The detailed run conditions and some of the analytical data for materials produced in these polymerization examples are listed in Table 1. The scavenger feed rate and catalyst feed rate were adjusted to reach the targeted conversion listed in Table 1 for each example. Molecular weight values listed in this table were results based on light scattering detector.

TABLE 1

| Example | 1 | 2 | 3 |
|---|---|---|---|
| Polymerization Conditions | | | |
| Polymerization temperature (° C.) | 115 | 115 | 115 |
| Reactor pressure (MPa) | 2.48 | 2.48 | 2.48 |
| Propylene feed rate (g/min) | 3.05 | 3.05 | 3.05 |
| Ethylene feed rate (SLPM) | 6 | 7 | 8 |
| Isohexane feed rate (g/min) | 58.8 | 58.8 | 58.8 |
| H2 feed rate (scc/min*) | 25 | 25 | 25 |
| Conversion (%) | 86.1 | 99.4 | 88.6 |
| Polymer Properties | | | |
| Mn (kg/mol) | 9.6 | 63.6 | 65.2 |
| Mw (kg/mol) | 83.2 | 93.9 | 101.7 |
| Mz (kg/mol) | 267.9 | 166.7 | 156.6 |
| Tc from a primary crystallization peak (° C.) | 94.7 | 88.7 | 81.8 |
| Tm from a primary melting peak (° C.) | 118.5 | 114.7 | 111.2 |
| Tg (° C.) | −52.4 | −45.7 | — |
| Heat effusion of the primary melting peak (J/g) | 74.6 | 15.6 | 7.2 |
| Tc from a secondary crystallization peak (° C.) | −13.8 | 13.7 | 30.9 |
| Tm from a secondary melting peak (° C.) | −4.13 | 31.2 | 50.7 |
| Heat effusion of the secondary melting peak (J/g) | 8.0 | 28.6 | 43.1 |
| Ethylene content (wt %) | 64.4 | 63.4 | 64.5 |

*Standard cubic centimeter per minute

Figure 3:
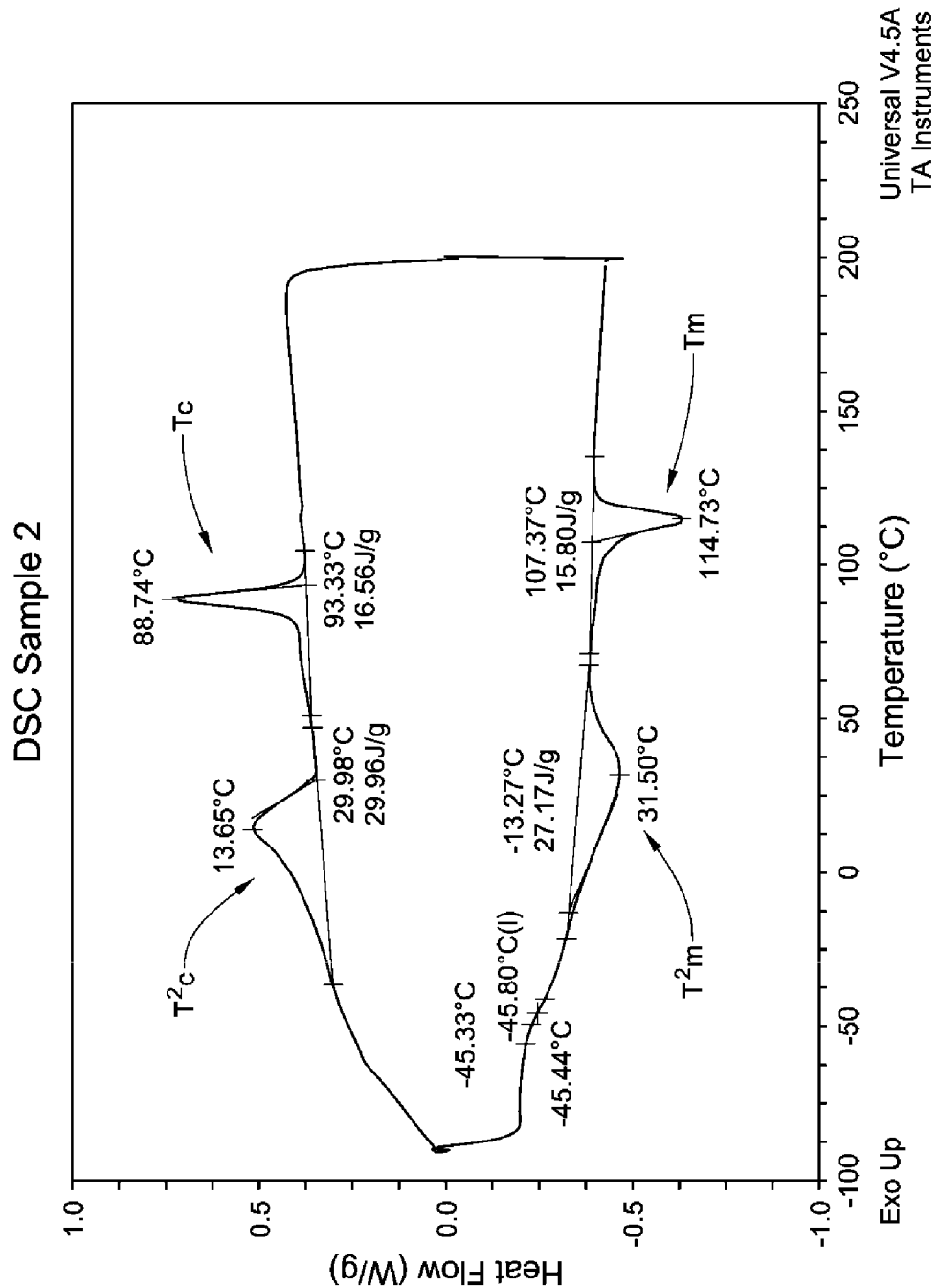
FIG. 3 is the DSC trace showing the presence of multiple melting peaks and multiple crystallization peaks of a polyolefin produced in Example 2 according to an embodiment of the instant disclosure.

All the polymers produced in Examples 1-3 have two melting peaks on the second heating cycle and two crystallization peaks on the same cooling cycle. This indicates the presence of polymer blends from in reactor products. The DSC trace of the polymer blend produced in Example 2 is shown in FIG. 3.

Examples 4 to 6

Examples 4-6 demonstrate the polymerization of propylene/ethylene copolymer using rac-dimethylsilylbis(indenyl) hafnium dimethyl. The metallocene was pre-activated with Me$_3$NH tetrakis(pentafluorophenyl)borate at a molar ratio of about 1:1 in toluene. The polymerization procedure was the same as that employed in Example 1-3. The scavenger feed rate and catalyst feed rate were adjusted to reach the targeted conversion listed in Table 2 for each example. The detailed polymerization conditions and some of analytical data for materials produced in these polymerization examples are listed in Table 2. At the temperature and pressure conditions described, the ethylene present in the reactor is in gaseous "bubble" form.

TABLE 2

| Example | 4 | 5 | 6 |
|---|---|---|---|
| Polymerization Conditions | | | |
| Polymerization temperature (° C.) | 130 | 130 | 130 |
| Reactor pressure (MPa) | 2.48 | 2.48 | 2.48 |
| Propylene feed rate (g/min) | 5.09 | 5.09 | 5.09 |
| Ethylene feed rate (SLPM) | 6 | 8 | 10 |
| Isohexane feed rate (g/min) | 52.2 | 52.2 | 52.2 |
| H2 feed rate (scc/min) | 20 | 20 | 20 |
| Conversion (%) | 37.2 | 38.2 | 36.1 |
| Polymer Properties | | | |
| Mn (kg/mol) | 17.2 | 20.4 | 22.5 |

TABLE 2-continued

| Example | 4 | 5 | 6 |
|---|---|---|---|
| Mw (kg/mol) | 47.8 | 62.8 | 67.6 |
| Mz (kg/mol) | 98.4 | 135.2 | 147.8 |
| Tc from a primary crystallization peak (° C.) | 96.0 | 96.8 | 102.6 |
| Tm from a primary melting peak (° C.) | 114.3 | 119.1 | 118.9 |
| Heat effusion of the primary melting peak (J/g) | 47.3 | 60.2 | 68.3 |
| Tc from a secondary crystallization peak (° C.) | 3.4 | 15.8 | 28.7 |
| Tm from a secondary melting peak (° C.) | 14.6 | 32.9 | 40.7 |
| Heat effusion of the secondary melting peak (J/g) | 17.6 | 14.6 | 11.7 |
| Ethylene content (wt %) | 77.1 | 81.9 | 85.6 |

Examples 7 to 9

Examples 7-9 demonstrate the polymerization of propylene/ethylene copolymer using rac-dimethylsilylbis(indenyl) hafnium dimethyl. The metallocene was pre-activated with Me$_3$NH tetrakis(pentafluorophenyl)borate at a molar ratio of about 1:1 in toluene. The detailed polymerization conditions and some of the analytical data for materials produced in these polymerization examples are listed in Table 3. The scavenger feed rate and catalyst feed rate were adjusted to reach the targeted conversion listed in Table 3 for each example. At the temperature and pressure conditions described below, the ethylene present in the reactor is in gaseous "bubble" form.

TABLE 3

| Example | 7 | 8 | 9 |
|---|---|---|---|
| Polymerization Conditions | | | |
| Polymerization temperature (° C.) | 120 | 120 | 120 |
| Reactor pressure (MPa) | 2.48 | 2.48 | 2.48 |
| Propylene feed rate (g/min) | 5.09 | 5.09 | 5.09 |
| Ethylene feed rate (SLPM) | 6 | 8 | 10 |
| Isohexane feed rate (g/min) | 52.2 | 52.2 | 52.5 |
| Conversion (%) | 72.2 | 61.04 | 64.05 |
| Polymer Properties | | | |
| Mn (kg/mol) | 37.2 | 59.8 | 73.0 |
| Mw (kg/mol) | 76.7 | 131.1 | 178.4 |
| Mz (kg/mol) | 131.7 | 232.0 | 323.3 |
| Tc from a primary crystallization peak (° C.) | 68.1 | 77.7 | 80.8 |
| Tm from a primary melting peak (° C.) | 93.8 | 105.3 | 108.2 |
| Heat effusion of the primary melting peak (J/g) | 8.6 | 66.3 | 13.7 |
| Tc from a secondary crystallization peak (° C.) | −7.0 | 17.6 | 26.8 |
| Tm from a secondary melting peak (° C.) | 1.9 | 34.0 | 47.9 |
| Heat effusion of the secondary melting peak (J/g) | 25.5 | — | 29.8 |
| Ethylene content (wt %) | 60.6 | 78.1 | 79.6 |

Examples 10 to 12

Examples 10-12 demonstrate the polymerization of propylene/ethylene copolymer using rac-dimethylsilylbis(indenyl) hafnium dimethyl. The metallocene was pre-activated with N,N-dimethylanilinium tetrakis(pentafluorophenyl)borate at a molar ratio of about 1:1 in toluene. The polymerization procedure was the same as that employed in Examples 1-3. The detailed polymerization conditions and some of the analytical data for materials produced in these polymerization examples are listed in Table 4. The catalyst feed rate was adjusted to reach the conversion listed in this table for each polymerization run.

TABLE 4

| Example | 10 | 11 | 12 |
|---|---|---|---|
| Polymerization Conditions | | | |
| Polymerization temperature (° C.) | 120 | 120 | 120 |
| Reactor pressure (MPa) | 2.0 | 2.41 | 2.82 |
| Propylene feed rate (g/min) | 5.09 | 5.09 | 5.09 |
| Ethylene feed rate (SLPM) | 6 | 6 | 6 |
| Isohexane feed rate (g/min) | 52.2 | 52.2 | 52.2 |
| Conversion (%) | 86.7 | 77.3 | 75.2 |
| Polymer Properties | | | |
| Mn (kg/mol) | 46.5 | 51.0 | 66.7 |
| Mw (kg/mol) | 92.4 | 102.8 | 109.4 |
| Mz (kg/mol) | 151.0 | 172.4 | 181.4 |
| Tc from a primary crystallization peak (° C.) | −9.8 | −4.4 | 1.1 |
| Tm from a primary melting peak (° C.) | −3.1 | 1.8 | 9.7 |
| Tg (° C.) | −52.9 | −51.6 | −52.0 |
| Heat effusion of the primary melting peak (J/g) | 21.3 | 22.0 | 26.1 |
| Tc from a secondary crystallization peak (° C.) | 45.9 | 50.6 | 53.1 |
| Tm from a secondary melting peak (° C.) | 90.0 | 91.9 | 94.2 |
| Heat of fusion from a secondary peak (J/g) | 4.7 | 5.8 | 5.7 |
| Ethylene content (wt %) | 63.3 | 61.0 | 72.3 |

All documents described herein are incorporated by reference herein, including any priority documents and/or testing procedures to the extent they are not inconsistent with this text, provided however that any priority document not named in the initially filed application or filing documents is NOT incorporated by reference herein. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law. Likewise whenever a composition, an element or a group of elements is preceded with the transitional phrase "comprising", it is understood that we also contemplate the same composition or group of elements with transitional phrases "consisting essentially of," "consisting of", "selected from the group of consisting of," or "is" preceding the recitation of the composition, element, or elements and vice versa. Thus, the term "comprising" encompasses the terms "consisting essentially of," "is," and "consisting of" and anyplace "comprising" is used "consisting essentially of," "is," or consisting of" may be substituted therefor.

We claim:

1. A process comprising contacting a catalyst system with one or more olefins in a bubble column reactor to form a polyolefin having a bimodal distribution with respect to composition distribution, molecular weight distribution or a combination thereof.

2. The process of claim 1, wherein the polyolefin comprises an Mw of 10,000 g/mol or more.

3. The process of claim 1, wherein the polyolefin comprises at least two melting peaks in a DSC heating cycle with a difference in melting temperatures of at least 5° C.

4. The process of claim 1, wherein the one or more olefins comprise ethylene, propylene, $C_4$ to $C_{20}$ alpha olefin, or a combination thereof.

5. The process of claim 1, wherein the catalyst system comprises a metallocene catalyst.

6. The process of claim 1, wherein the catalyst system comprises a homogenous catalyst and the bubble column reactor comprises a polymer solution reactor.

7. The process of claim 1, wherein the catalyst system comprises a supported catalyst and the bubble column reactor comprises a polymer slurry reactor.

8. The process of claim 1 comprising sparging a gaseous olefin feedstream into a bulk liquid phase in the bubble column reactor.

9. The process of claim 1 comprising introducing first and second olefin feedstreams into a bulk liquid phase in the bubble column reactor, wherein the first olefin feedstream is liquid and the second olefin feedstream is gaseous.

10. The process of claim 9, wherein the first olefin feedstream comprises propylene and the second olefin feedstream comprises ethylene.

11. The process of claim 10, wherein the second olefin feedstream further comprises propylene.

12. The process of claim 9, wherein the second olefin feedstream further comprises a gaseous diluent, hydrogen, or a combination thereof.

13. The process of claim 9 further comprising recycling overhead vapor from the bubble column reactor to the second olefin feedstream.

14. The process of claim 9 further comprising recovering a polyolefin product stream from the bulk liquid phase, recovering polyolefin from the polyolefin product stream to form a polyolefin-lean stream, and recycling at least a portion of the polyolefin-lean stream to the bubble column reactor.

15. The process of claim 9 further comprising maintaining a heterogeneous regime (churn-turbulent regime) in the bulk phase.

16. The process of claim 1 further comprising supplying a liquid diluent to a bulk phase in the bubble column reactor.

* * * * *